(12) United States Patent
Sohn

(10) Patent No.: US 11,967,886 B2
(45) Date of Patent: Apr. 23, 2024

(54) PORTABLE SELF-POWER-GENERATING APPARATUS

(71) Applicant: N-RIT CO., LTD., Paju-si (KR)

(72) Inventor: Dae Up Sohn, Paju-si (KR)

(73) Assignee: N-RIT CO., LTD., Paju-si (KR)

( * ) Notice: Subject to any disclaimer, the term of this patent is extended or adjusted under 35 U.S.C. 154(b) by 656 days.

(21) Appl. No.: 17/262,134

(22) PCT Filed: Jul. 22, 2019

(86) PCT No.: PCT/KR2019/009006
§ 371 (c)(1),
(2) Date: Jan. 21, 2021

(87) PCT Pub. No.: WO2020/022719
PCT Pub. Date: Jan. 30, 2020

(65) Prior Publication Data
US 2021/0351662 A1    Nov. 11, 2021

(30) Foreign Application Priority Data

Jul. 23, 2018 (KR) .......................... 10-2018-0085174

(51) Int. Cl.
| H02K 7/02 | (2006.01) |
| F03G 5/00 | (2006.01) |
| F03G 5/06 | (2006.01) |
| H02K 7/116 | (2006.01) |
| H02K 7/18 | (2006.01) |
| F16H 55/26 | (2006.01) |

(52) U.S. Cl.
CPC ........... *H02K 7/1853* (2013.01); *F03G 5/065* (2021.08); *F03G 5/086* (2021.08); *H02K 7/02* (2013.01); *H02K 7/116* (2013.01); *F03G 5/066* (2021.08); *F16H 55/26* (2013.01)

(58) Field of Classification Search
CPC ........ H02K 7/1853; H02K 7/02; H02K 7/116; H02K 7/06; H02K 7/18; F03G 5/065; F03G 5/086; F16H 33/02; F16H 19/06; F16H 19/043
See application file for complete search history.

(56) References Cited

U.S. PATENT DOCUMENTS

| 2010/0011890 A1* | 1/2010 | Tseng ................... H02K 7/1853 74/143 |
| 2019/0273426 A1* | 9/2019 | Huang ................... H02K 33/16 |

FOREIGN PATENT DOCUMENTS

| JP | 2004-260896 A | 9/2004 |
| KR | 10-2006-0125152 A | 12/2006 |
| KR | 10-0704886 B1 | 4/2007 |
| KR | 2009-0062090 A | 6/2009 |
| KR | 10-1596430 B1 | 2/2016 |

(Continued)

*Primary Examiner* — Leda T Pham
(74) *Attorney, Agent, or Firm* — NKL LAW; Jae Youn Kim

(57) ABSTRACT

Proposed is a portable self-power-generating apparatus which has small size and is capable of charging a battery by realizing self-power generation with high efficiency in emergencies in which normal electricity supply is not available, such as a military operation, a refugee village, a disaster caused by earthquake or the like, an emergency situation on ships, or an outdoor activity, and which can be used in combination with various smart modules.

16 Claims, 16 Drawing Sheets

(56) References Cited

FOREIGN PATENT DOCUMENTS

| KR | 10-2017-0018702 A | 2/2017 |
|---|---|---|
| KR | 2017-0018702 A | 2/2017 |
| KR | 10-2017-0042395 A | 4/2017 |
| KR | 10-1750023 B1 | 6/2017 |

* cited by examiner

PORTABLE SELF-POWER-GENERATING APPARATUS

CROSS-REFERENCE TO RELATED APPLICATIONS

This application is a national stage entry under 35 USC 371 of PCT/KR2019/009006, filed Jul. 22, 2019, which claims priority to KR10-2018-0085174, filed Jul. 23, 2018, the disclosure of which is incorporated by reference herein in its entirety.

TECHNICAL FIELD

The present invention relates to a portable self-power-generating apparatus using a rack gear member and a pinion gear member, and more particularly, to a portable self-power-generating apparatus which has a small size and is capable of charging a battery by realizing self-power generation with high efficiency in emergencies in which the supply of electricity is not available normally, such as a military operation, a refugee village, a disaster caused by earthquake or the like, emergency situations on ships, or an outdoor activity, and which may be used in combination with various smart modules.

BACKGROUND ART

In general, electricity is used as a major energy source in an industrial society, but due to the depletion of fossil energy, in recent years, investments and developments in various alternative power generation facilities such as solar power generation, wind power generation, and tidal power generation are rapidly progressing. Meanwhile, electricity produced in power generation facilities is supplied to household and industrial devices or products through power cables and is used as an energy source, but most products that require portability or activity, such as small-scale home appliances or daily necessities, have batteries, such as a primary battery and a secondary battery, which are used as a power source.

Further, as society is advanced, various electronic devices are developed, and the population using the electronic devices is increasing day by day. In recent years, the use of portable electronic devices such as smartphones is increasing. Further, with the development of outdoor leisure cultures such as fishing and climbing, a time to live outdoors is increasing, and thus spare batteries are provided and used.

However, since the usage time of the batteries is limited, the batteries should be recharged again and used when power is discharged, but the batteries cannot be recharged while moving or outdoors. Further, in situations in which the batteries are discharged and the supply of electricity is not available normally, such as military operations, refugee villages, disasters caused by earthquake or the like, and emergency situations on ships, communication for rescue requests, electrical devices for lighting, smartphones, table personal computers (PCs), and laptops cannot be operated.

Accordingly, in recent years, portable self-power-generating apparatuses have been proposed and used in which electrical energy consumed by various electronic devices used during outdoor activities such as military operations, fishing, and climbing is obtained through self-power generation, and thus the power required in an emergency may be used. Such a portable self-power-generating apparatus according to the related art has a problem in that when a user wants to generate electrical energy, since a separate operation such as a predetermined operation (rotational movement of a lever) should be implemented, a very small amount of energy may be acquired as compared to inconvenience of use and a time-consuming operation, and thus the portable self-power-generating apparatus cannot be applied to an actual electric device.

An example of a technology for solving this problem is disclosed in the following patent documents.

For example, Korean Patent Application Publication No. 2009-0062090 (published on Jun. 17, 2009, Patent Document 1) discloses a portable small power generation device in which, as illustrated in FIG. 1, a linear power generation device, which is provided with a piston rod 11 reciprocating by power generated by a power generator, includes an actuator 1 installed on the piston rod 11 and a stator 2 installed to surround the actuator 1 and having permanent magnets 21 and coils 22 installed in an inner wall thereof, wherein the length of the actuator 1 is formed such that an end of the piston rod 11 does not reach an end, which faces the coil 22, of one permanent magnet of the two permanent magnets 21 in a state in which the piston rod 11 is sufficiently moved in any one direction.

Further, Korean Patent Application Publication No. 2017-0018702 (published on Feb. 20, 2017, Patent Document 2) discloses a power generation device including a rack, a pinion disposed in engagement with the rack and provided with a stator on an inner circumferential surface thereof, a rotor inserted into the pinion and spaced apart from the stator, a first rotor rotation unit configured to rotate the rotor in one direction by using a rotational force of the pinion generated when the rack is linearly moved in one direction, and a second rotor rotation unit configured to rotate the rotor in the one direction by using a reverse rotational force of the pinion generated when the rack is linearly moved in the other direction.

Meanwhile, Korean Patent No. 10-1596430 (registered on Feb. 16, 2016, Patent Document 3) filed and registered by the present inventor discloses a self-power-generating apparatus including a drive shaft that rotates alternately in the forward or reverse directions by an external force, a forward power transmission unit that transmits only a forward rotational force of the drive shaft to a power generation shaft, a reverse power transmission unit that transmits only a reverse rotational force of the drive shaft to the power generation shaft, and a power generator that generates power using a rotational force of the power generation shaft in one direction.

DISCLOSURE

Technical Problem

The technology disclosed in Patent Document 1 as described above discloses a piston rod that reciprocates by power generated by a power generator. However, there is no detailed description of a configuration of the power generator which generates power, and a description of a configuration and operation of the piston rod which performs a reciprocating motion is also unclear.

Further, the technology disclosed in Patent Document 2 discloses a power generating device that may generate electricity by using vibrations transmitted from a road surface via a vehicle to a vehicle body. Due to the lack of portability for outdoor use, a user may not generate power when necessary while carrying the power generating device.

Meanwhile, in the technology disclosed in Patent Document 3, components may be damaged by repeated use for a long time, and when the state of a wire wound around the pulley becomes loose, a self-power-generating apparatus may not be operated, and power generation is performed by pulling the wire, but the energy of rewinding may not be used. Further, in the technology disclosed in the Patent Document 3, a plurality of components for supporting the wire according to the operation of the wire are required.

The present invention is directed to providing a portable self-power-generating apparatus in which in a military operation, a refugee village, a disaster caused by earthquake or the like, emergency situations on ships, or an outdoor activity such as fishing and climbing, the user may continuously generate power for a long time with one hand or both hands to charge a battery.

The present invention is also directed to providing a portable self-power-generating apparatus that may continuously generate power even when any one pinion gear member is damaged because a plurality of pinion gear members are provided.

The present invention is also directed to providing a portable self-power-generating apparatus that may achieve high efficiency power generation by simplifying configurations of components and making the components compact.

The present invention is also directed to providing a portable self-power-generating apparatus that may continuously generate power even when a failure occurs in one of a first rotation member and a second rotation member because one pinion gear member includes the first rotation member and the second rotation member.

The present invention is also directed to providing a portable self-power-generating apparatus that may reduce a manufacturing cost of the power generating apparatus by designing and manufacturing a first rotation member and a second rotation member with the same components.

Technical Solution

One aspect of the present invention provides a portable self-power-generating apparatus for performing self-power generation by a user, which includes a main body, a rack gear member that linearly reciprocates inside the main body by the user, a plurality of pinion gear members provided inside the main body, coupled to the rack gear member, and configured to perform a forward rotation or a reverse rotation according to a linear reciprocating motion of the rack gear member, a rotation member provided in each of the plurality of pinion gear members and configured to rotate according to the forward rotation or the reverse rotation of each of the pinion gear members, and a power generation member configured to generate power according to the rotation of the rotation member, wherein a first opening and a second opening through which the rack gear member enters or exits are provided at upper portions of the main body, and wherein each of the plurality of pinion gear members sequentially performs the forward rotation or the reverse rotation according to the linear reciprocating motion of the rack gear member.

The rack gear member may include a rack gear part provided inside the main body and configured to rotate each of the plurality of pinion gear members in the forward rotation or the reverse rotation, and a handle part provided outside the main body and allowing the user to linearly reciprocate the rack gear part.

The portable self-power-generating apparatus may further include a locking part provided in the rack gear member to prevent the rack gear member from being separated from the main body.

The rack gear part and the handle part may be coupled by a hinge.

The rack gear part may include a first rack gear part and a second rack gear part, and the first rack gear part and the second rack gear part may be connected by a second hinge.

The plurality of pinion gear members may be provided in a row.

The plurality of pinion gear members may be provided in a plurality of rows.

The rack gear part may be provided as a pair of rack gear parts in a vertical direction or a lateral direction of the rack gear member, and the plurality of pinion gear members may be coupled to each of the pair of rack gear parts.

The rack gear member may include a first rack gear member provided corresponding to the plurality of pinion gear members provided in a first row, and a second rack gear member provided corresponding to the plurality of pinion gear members provided in a second row.

A support part which supports the main body when the user performs self-power generation may be provided at a lower portion of the main body.

The rotation member may include a first rotation member and a second rotation member fitted to left and right sides or upper and lower sides of the pinion gear member, the first rotation member may rotate in a counterclockwise direction, and the second rotation member may rotate in a clockwise direction.

The first rotation member may include a first lock plate mounted on one side of the pinion gear member, a first flywheel having a first clutch gear formed therein and configured to rotate the power generation member in one direction according to the reverse rotation of the pinion gear member, and a first lock member mounted on the first lock plate and configured to rotate the first flywheel, and the second rotation member may include a second lock plate mounted on the other side of the pinion gear member, a second flywheel having a second clutch gear formed therein and configured to rotate the power generation member in one direction according to the forward rotation of the pinion gear member, and a second lock member mounted on the second lock plate and configured to rotate the second flywheel.

The power generation member may include a gear part coupled to the first flywheel and the second flywheel to rotate in one direction.

Another aspect of the present invention provides a portable self-power-generating apparatus for performing self-power generation by a user, which includes a main body, a rack gear member that linearly reciprocates inside the main body by the user, a plurality of pinion gear members provided inside the main body, coupled to the rack gear member, and configured to perform a forward rotation or a reverse rotation according to the linear reciprocating motion of the rack gear member, a rotation member provided in each of the plurality of pinion gear members and configured to rotate according to the forward rotation or the reverse rotation of each of the pinion gear members, a power generation member configured to generate power according to the rotation of the rotation member, and a rotation unit, wherein the rack gear member includes a rack gear part provided in the main body and configured to rotate each of the plurality of pinion gear members in the forward or reverse rotation, each of the plurality of pinion gear members sequentially performs the forward rotation or the reverse rotation according to the linear reciprocating motion of the rack gear member, the rack gear part maintains a state of being wound around the rotation unit, and gear grooves engaged with gear teeth of the plurality of pinion gear members are provided in the rack gear part.

The rotation unit may include a reel rotatably mounted in the main body, configured to maintain the rack gear part in a wound state, and configured to rotate according to pulling and winding of the rack gear part, a spiral spring made of spring steel and configured to maintain the rack gear part in a state of being wound around the reel, and a spring cover part fitted to the reel and having the spiral spring embedded therein.

The power generation member may include a stator provided on an inner circumferential surface of each of the plurality of pinion gear members, and a rotor inserted into the pinion gear member, provided to be spaced apart from the stator, and configured to rotate only in one direction according to the forward rotation or the reverse rotation of the pinion gear members.

Advantageous Effects

According to the portable self-power-generating apparatus according to the present invention, a rack gear member that linearly reciprocates and a plurality of pinion gear members coupled to the rack gear member and rotating forward or in reverse according to the linearly reciprocating motion of the rack gear member are provided, a user repeatedly performs the operation of pulling the rack gear member with one hand or both hands, and thus a large amount of power generation can be continuously performed with high efficiency for a long time in a relatively comfortable state.

According to the portable self-power-generating apparatus according to the present invention, since all of the reciprocating motion of the rack gear member can be applied to the power generation, power generation efficiency can be improved.

According to the portable self-power-generating apparatus according to the present invention, a configuration is provided in which a lock plate and a lock member are accommodated in the inner spaces of a first flywheel and a second flywheel, and thus the portable self-power-generating apparatus can be downsized.

According to the portable self-power-generating apparatus according to the present invention, by providing the plurality of pinion gear members, even when one of the pinion gear members is damaged when used for a long time, self-power generation can be performed by continuing to use the remaining pinion gear members.

MODES OF THE INVENTION

Figure 1:
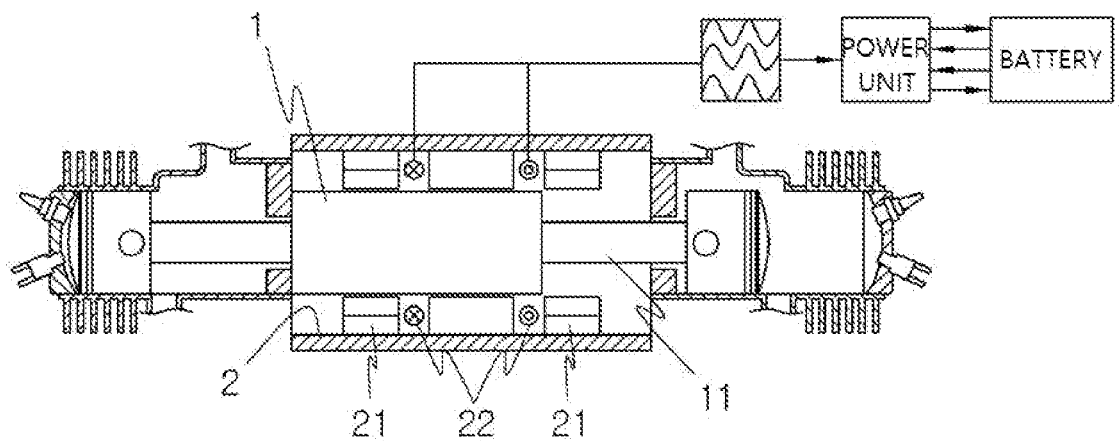
FIG. 1 is a cross-sectional view of a portable small power generation device according to a related art.

The above and other purposes and new features of the present invention will become more apparent from the description of the present specification and the accompanying drawings.

In the description of the configuration and operation of a portable self-power-generating apparatus according to the present invention, a first rotation member and a second rotation member provided on left and right sides or upper and lower sides of a pinion gear member may be described as a pair of rotation members.

Further, since the first rotation member and the second rotation member operate independently of each other and the first rotation member and the second rotation member are manufactured using the same components, the first rotation member and the second rotation member are simply described as a rotation member. Further, in the description of components of each of the first rotation member and the second rotation member, the same reference numerals may be designated for description.

Hereinafter, embodiments of a portable self-power-generating apparatus according to the present invention will be described with reference to the drawings.

First Embodiment

Figure 2:
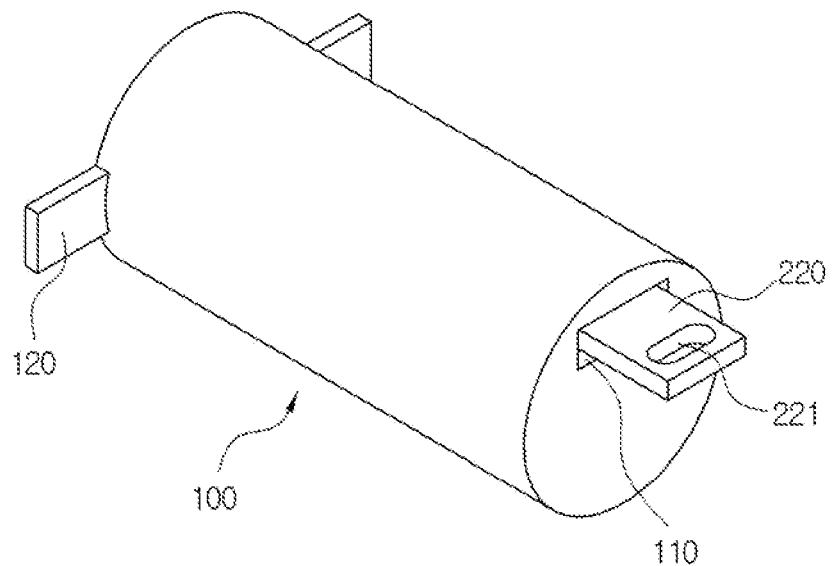
FIG. 2 is a perspective view of an exterior of a portable self-power-generating apparatus according to a first embodiment of the present invention.
Figure 3:
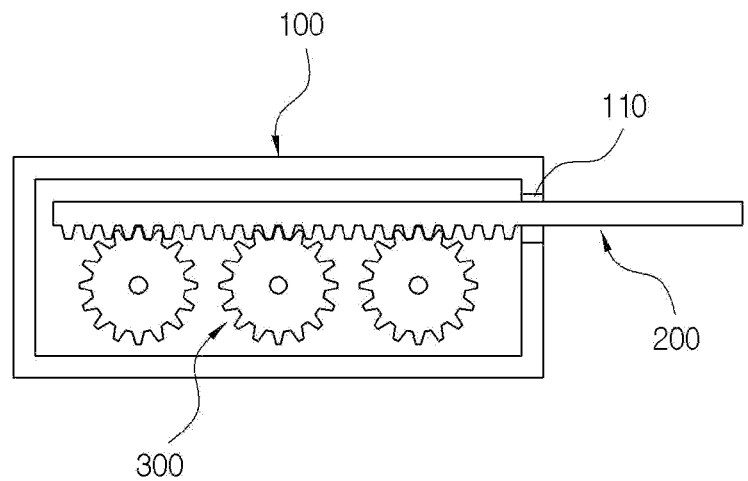
FIG. 3 is a conceptual view of the portable self-power-generating apparatus according to the first embodiment of the present invention.
Figure 4A:
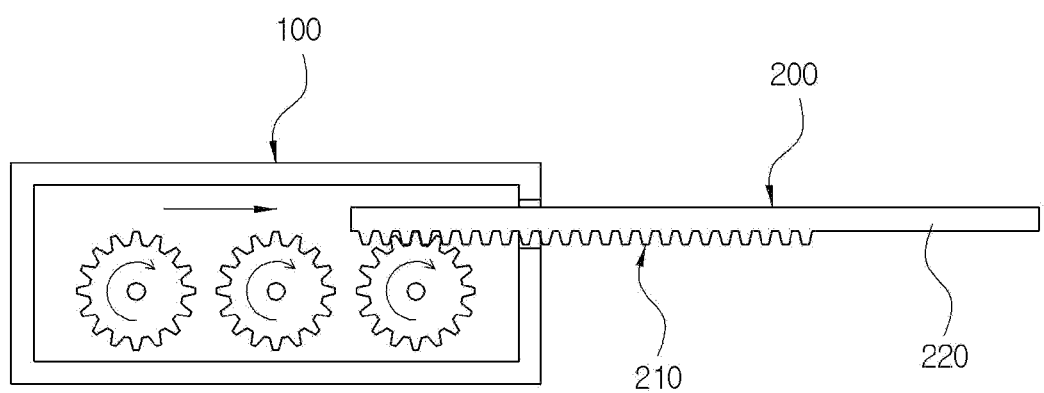
FIGS. 4A-4B are views for describing an operation of the portable self-power-generating apparatus illustrated in FIG. 3.
Figure 4B:
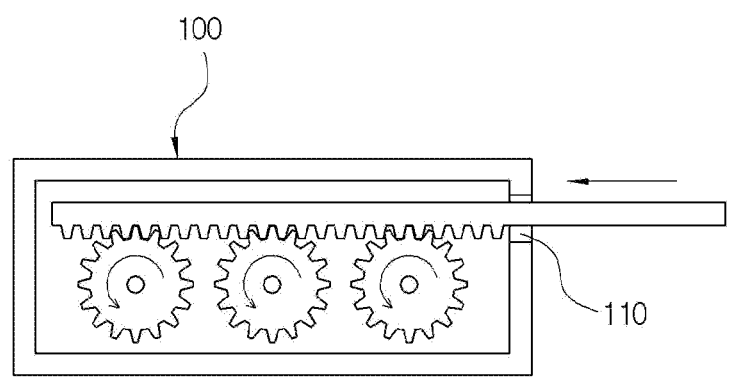
Figure 5:
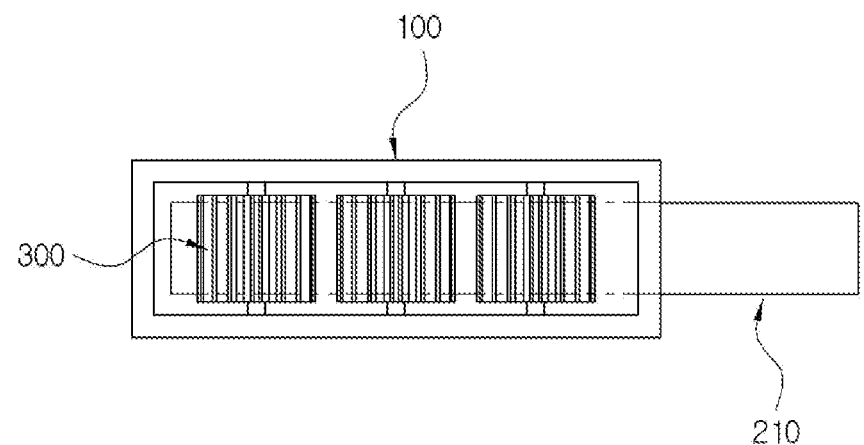
FIG. 5 is a plan view illustrating a layout of a rack gear member and a plurality of pinion gear members illustrated in FIG. 3.

FIG. 2 is a perspective view of an exterior of a portable self-power-generating apparatus according to a first embodiment of the present invention, FIG. 3 is a conceptual view of the portable self-power-generating apparatus according to the first embodiment of the present invention, FIGS. 4A-4B are views for describing an operation of the portable self-power-generating apparatus illustrated in FIG. 3, and FIG. 5 is a plan view illustrating a layout of a rack gear member and a plurality of pinion gear members illustrated in FIG. 3.

As illustrated in FIGS. 2 and 3, the portable self-power-generating apparatus according to the first embodiment of the present invention includes a main body 100, a rack gear member 200 that linearly reciprocates inside the main body 100, and a plurality of pinion gear members 300 that are provided inside the main body 100, are coupled to the rack gear member 200, and rotate forward or in reverse according to the linear reciprocating motion of the rack gear member 200, wherein each of the plurality of pinion gear members 300 rotates forward or in reverse in sequence according to the linear reciprocating motion of the rack gear member 200.

As illustrated in FIG. 2, the main body 100 has a substantially cylindrical shape, a first opening 110 through which the rack gear member 200 enters or exits is provided in an upper portion of the main body 100, and a pair of support parts 120 for supporting with both feet when a user performs self-power-generation are provided in lower portions of the main body 100. Further, the main body 100 may be made of a metal or polycarbonate that is engineering plastic. Meanwhile, FIG. 2 illustrates a configuration in which the main body 100 has a substantially cylindrical shape, but the present invention is not limited thereto, and the main body 100 may have a polyhedron shape such as a quadrangular shape or a pentagonal shape. As illustrated in FIG. 2, the inner diameter of the main body 100 formed in a cylindrical shape may be changed according to the outer diameter of the pinion gear member and is not limited to a specific size.

Further, although FIG. 2 illustrates a structure in which the support parts 120 for supporting with both feet in use are provided, a structure in which the rack gear member 200 is operated with one hand and the main body 100 is gripped with the other hand may be provided. For such gripping, a shape for gripping, for example, a shape of a finger, may be provided at an approximately central portion of the main body 100. Meanwhile, a guide part is provided inside the main body 100 in a lengthwise direction of the rack gear member 200 in order to prevent the rack gear member 200 from being separated from a movement path when the rack gear member 200 moves linearly.

As illustrated in FIGS. 4A-4B, the rack gear member 200 includes a rack gear part 210 provided with gear teeth engaged with gear teeth of the plurality of pinion gear members 300 such that the pinion gear members 300 rotate forward or in reverse, and a handle part 220 for linearly moving the rack gear part 210 using a user's hand. As illustrated in FIG. 2, a hook groove 221 for gripping the handle part 220 by hooking a user's finger is provided at an end of the handle part 220.

Thus, as illustrated in FIG. 4A, by pulling the handle part 220, the rack gear part 210 is withdrawn from the main body 100, and accordingly, each pinion gear member of the plurality of pinion gear members 300 rotates in a clockwise direction. Further, as illustrated in FIG. 4B, by pushing the handle part 220, the rack gear part 210 is inserted into the main body 100, and accordingly, each pinion gear member of the plurality of pinion gear members 300 rotates in a counterclockwise direction.

The number of screw teeth formed in the rack gear part 210 is not limited, and the width of the screw teeth may be provided to be smaller than the width of screw teeth of a pinion gear, as illustrated in FIG. 5.

In FIG. 3, the plurality of pinion gear members 300 has a structure in which three pinion gear members 300 are arranged in a row, but the present invention is not limited thereto, and four or more pinion gear members may be provided. Each pinion gear member is rotatably supported on both side walls in the main body 100 by a shaft. To this end, shaft insertion holes corresponding to the plurality of pinion gear members 300 are provided on both side walls of the main body 100.

Meanwhile, the rack gear member 200 and the pinion gear member may also be made of a metal or polycarbonate that is engineering plastic, which is the same material as the main body 100.

Next, a structure of the rack gear member 200 will be described with reference to FIG. 6.

Figure 6:
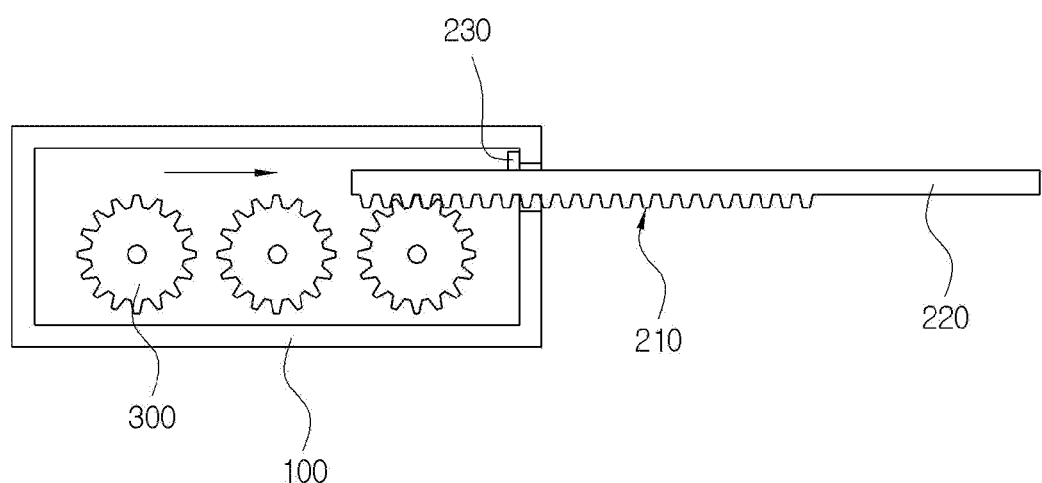
FIG. 6 is a view illustrating an operation of a locking part provided in the rack gear member illustrated in FIG. 3.

FIG. 6 is a view illustrating an operation of a locking part provided in the rack gear member illustrated in FIG. 3.

In the portable self-power-generating apparatus according to the present invention, in the rack gear part 210, as illustrated in FIG. 6, a locking part 230 is provided at an upper portion of the rack gear part 210 to prevent the rack gear part 210 from being separated from the main body 100 when the rack gear part 210 is withdrawn from the main body 100. The shape of the locking part 230 is not specified and is sufficient as long as only a function of preventing the locking part 230 from passing through the first opening 110 of the main body 100 may be achieved. Further, in FIG. 6, the position of the locking part 230 is illustrated so that an end portion of the rack gear part 210 is located in a third pinion gear member, but the present invention is not limited thereto, and the locking part 230 may be provided at a position where the screw teeth of the rack gear part 210 is not separated from the screw teeth of the pinion gear member.

Second Embodiment

Next, a portable self-power-generating apparatus according to a second embodiment of the present invention will be described with reference to FIGS. 7A-7B. Further, in the second embodiment, the same reference numerals are assigned to the same parts as in the first embodiment, and a repeated description thereof will be omitted.

Figure 7A:
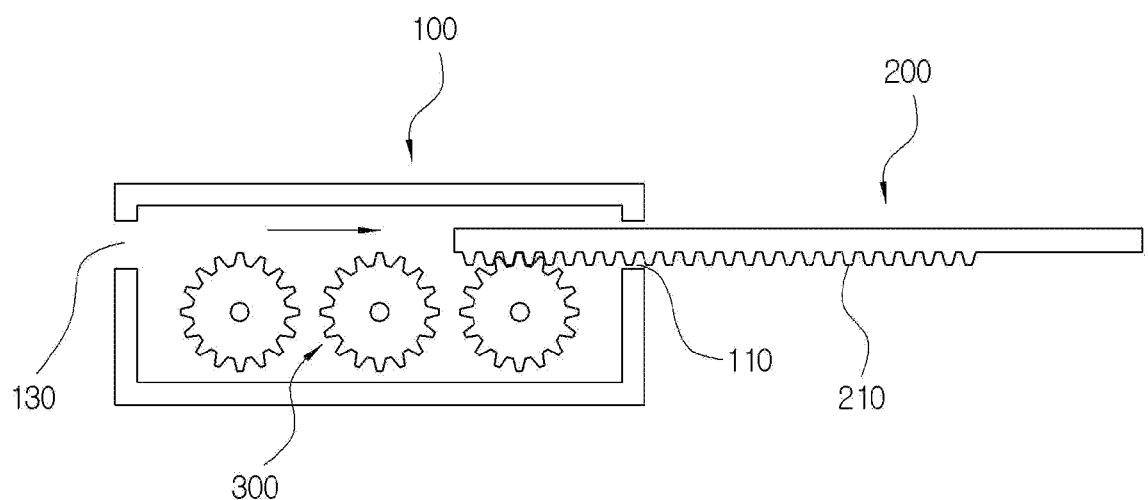
FIGS. 7A-7B are views illustrating a configuration of a main body of a portable self-power-generating apparatus according to a second embodiment of the present invention.
Figure 7B:
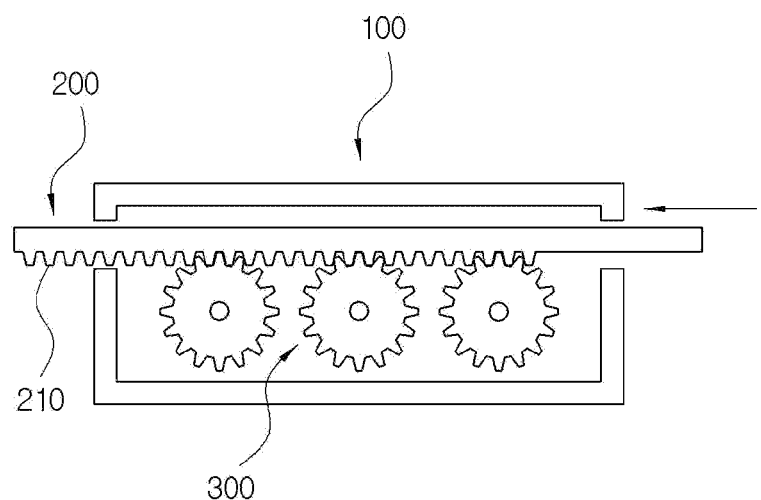

FIGS. 7A-7B are views illustrating a configuration of the main body 100 of the portable self-power-generating apparatus according to the second embodiment of the present invention.

As described above, in the portable self-power-generating apparatus according to the first embodiment of the present invention, a structure is illustrated in which by providing the first opening 110 in the main body 100, the rack gear member 200 is withdrawn and inserted only in a right direction as illustrated in FIG. 4. However, in the second embodiment, as illustrated in FIGS. 7A-7B, by further providing a second opening 130 on a left side of the main body 100, the rack gear member 200 may be withdrawn and inserted in a left-right direction of the main body 100.

That is, by providing the first opening 110 in the main body 100 and the second opening 130 at a position corresponding to the first opening 110, as illustrated in FIG. 7A, the rack gear part 210 is withdrawn to the right side through the first opening 110 of the main body 100 by pulling the handle part 220, and accordingly, each pinion gear member of the plurality of pinion gear members 300 rotates in the clockwise direction. Further, as illustrated in FIG. 7B, the rack gear part 210 is inserted into the main body 100 by pushing the handle part 220, the rack gear part 210 is withdrawn from the left side through the second opening 130 of the main body 100 by continuously pushing the handle part 220, and accordingly, each pinion gear member of the plurality of pinion gear members 300 rotates in the counterclockwise direction.

Thus, in the second embodiment illustrated in FIGS. 7A-7B, when compared to the first embodiment illustrated in FIG. 4, as the amount of rotation of the plurality of pinion gear members 300 increases, the amount of power generation may increase.

Third Embodiment

Next, a portable self-power-generating apparatus according to a third embodiment of the present invention will be described with reference to FIGS. 8A-8C. Further, even in the third embodiment, the same reference numerals are assigned to the same parts as in the first embodiment, and a repeated description thereof will be omitted.

Figure 8A:
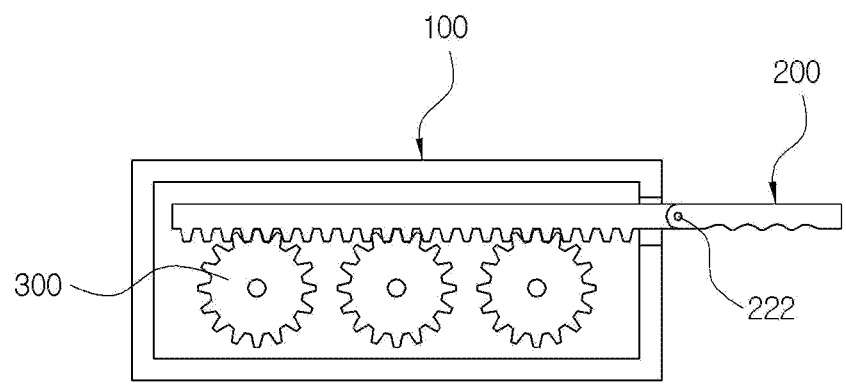
FIGS. 8A-8C are views for describing a configuration of a rack gear member of a portable self-power-generating apparatus according to a third embodiment of the present invention.
Figure 8B:
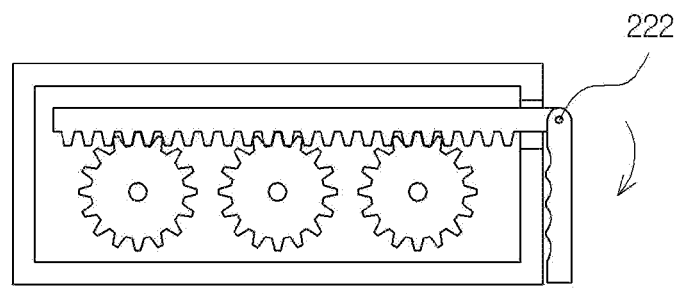
Figure 8C:
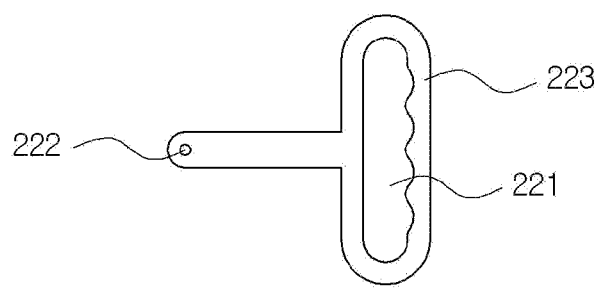

FIGS. 8A-8C for describing a configuration of a rack gear member of the portable self-power-generating apparatus according to the third embodiment of the present invention.

In the first and second embodiments described above, in the portable self-power-generating apparatus, as illustrated in FIG. 2, it is illustrated that in the rack gear member 200, the handle part 220 protrudes to extend from the main body 100. However, in the third embodiment, for convenience of storage and movement, as illustrated in FIG. 8A, the rack gear part 210 and the handle part 220 may be coupled to each other by a first hinge 222. By providing the first hinge 222, the handle part 220 may be folded as illustrated in FIG. 8B for convenience of storage or movement of the main body 100. Further, the handle part 220 may be provided with a handle 223 as illustrated in FIG. 8C to allow the user to grip more certainly as compared to a structure illustrated in FIG. 2.

Further, the structure of the first hinge 222 is not specified and is sufficient as long as the rack gear member 200 may be operated while maintaining a horizontal state in a state illustrated in FIG. 8A.

Fourth Embodiment

Next, a portable self-power-generating apparatus according to a fourth embodiment of the present invention will be described with reference to FIGS. 9A-9C. Further, even in the fourth embodiment, the same reference numerals are assigned to the same parts as in the second embodiment, and a repeated description thereof will be omitted.

Figure 9A:
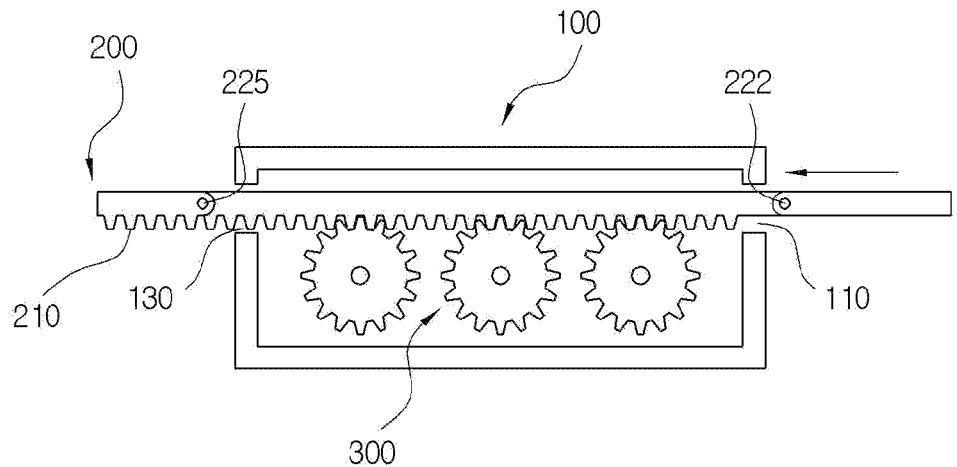
FIGS. 9A-9C are views for describing a configuration of a rack gear member of a portable self-power-generating apparatus according to a fourth embodiment of the present invention.
Figure 9B:
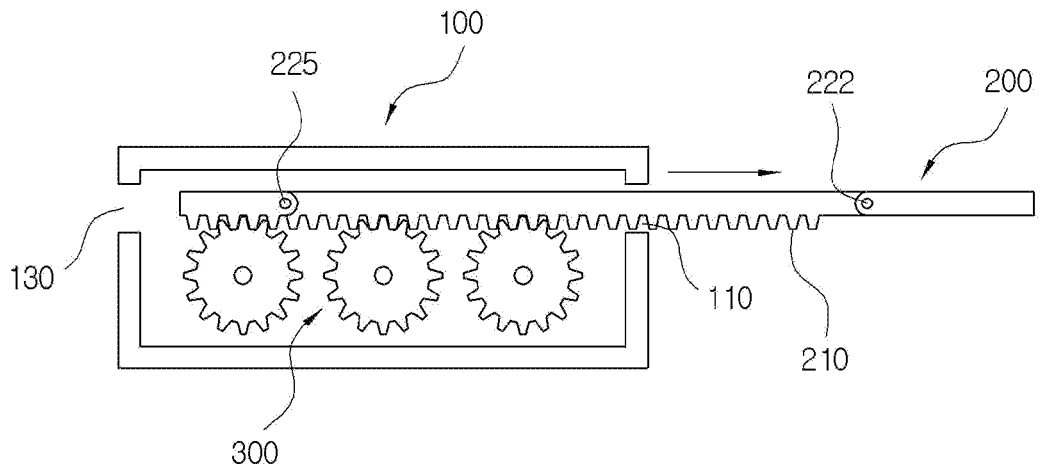
Figure 9C:
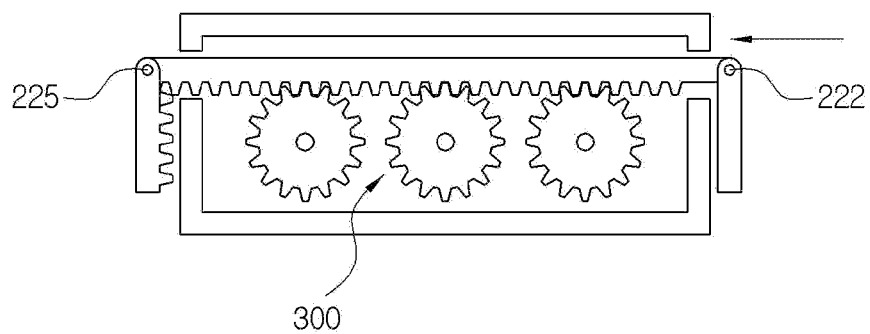

FIGS. 9A-9C are views for describing a configuration of a rack gear member of the portable self-power-generating apparatus according to the fourth embodiment of the present invention.

In the main body 100 of the portable self-power-generating apparatus according to the fourth embodiment, as illustrated in FIGS. 9A and 9B, a structure is provided in which the first opening 110 is provided at the right side of the main body 100, the second opening 130 is provided at the left side of the main body 100, the rack gear part 210 and the handle part are coupled to each other by the first hinge 222, and the rack gear part 210 extends by a second hinge 225.

That is, by providing a structure in which the rack gear part 210 includes a first rack gear part and a second rack gear part and the first rack gear part and the second rack gear part are connected to each other by the second hinge 225, the rack gear part 210 may be withdrawn and inserted in the left-right direction of the main body 100. Thus, in the fourth embodiment illustrated in FIG. 9, the amount of rotation of the plurality of pinion gear members 300 may be further increased as compared to the second embodiment illustrated in FIG. 7. Thus, in the fourth embodiment, when compared to the first embodiment, as the amount of rotation of the plurality of pinion gear members 300 increases, the amount of power generation may increase.

Further, in the fourth embodiment, as illustrated in FIG. 9C, by providing the first hinge 222 and the second hinge 225, for convenience of storage or movement of the main body 100, as illustrated in FIG. 9C, the first rack gear part and the handle part 220 may be folded. Further, the handle 223 as illustrated in FIG. 8C may be provided in the handle part.

Further, like the first hinge 222, the structure of the second hinge 225 is not specified and is sufficient as long as the rack gear member 200 may be operated while maintaining a horizontal state in a state illustrated in FIG. 8A.

Fifth Embodiment

Next, a portable self-power-generating apparatus according to a fifth embodiment of the present invention will be described with reference to FIGS. 10 and 11. Further, even in the fifth embodiment, the same reference numerals are assigned to the same parts as in the first embodiment, and a repeated description thereof will be omitted.

Figure 10:
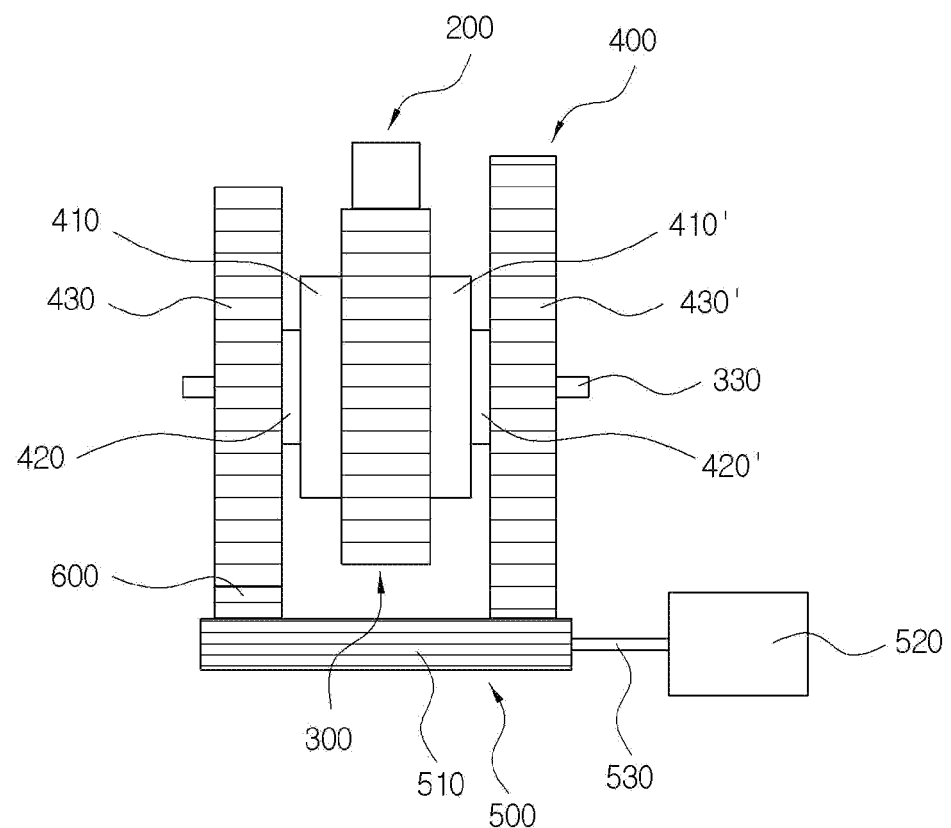
FIG. 10 is a view for describing a coupling relationship between a pinion gear member, a rotation member, and a power generation member in a portable self-power-generating apparatus according to a fifth embodiment of the present invention.
Figure 11:
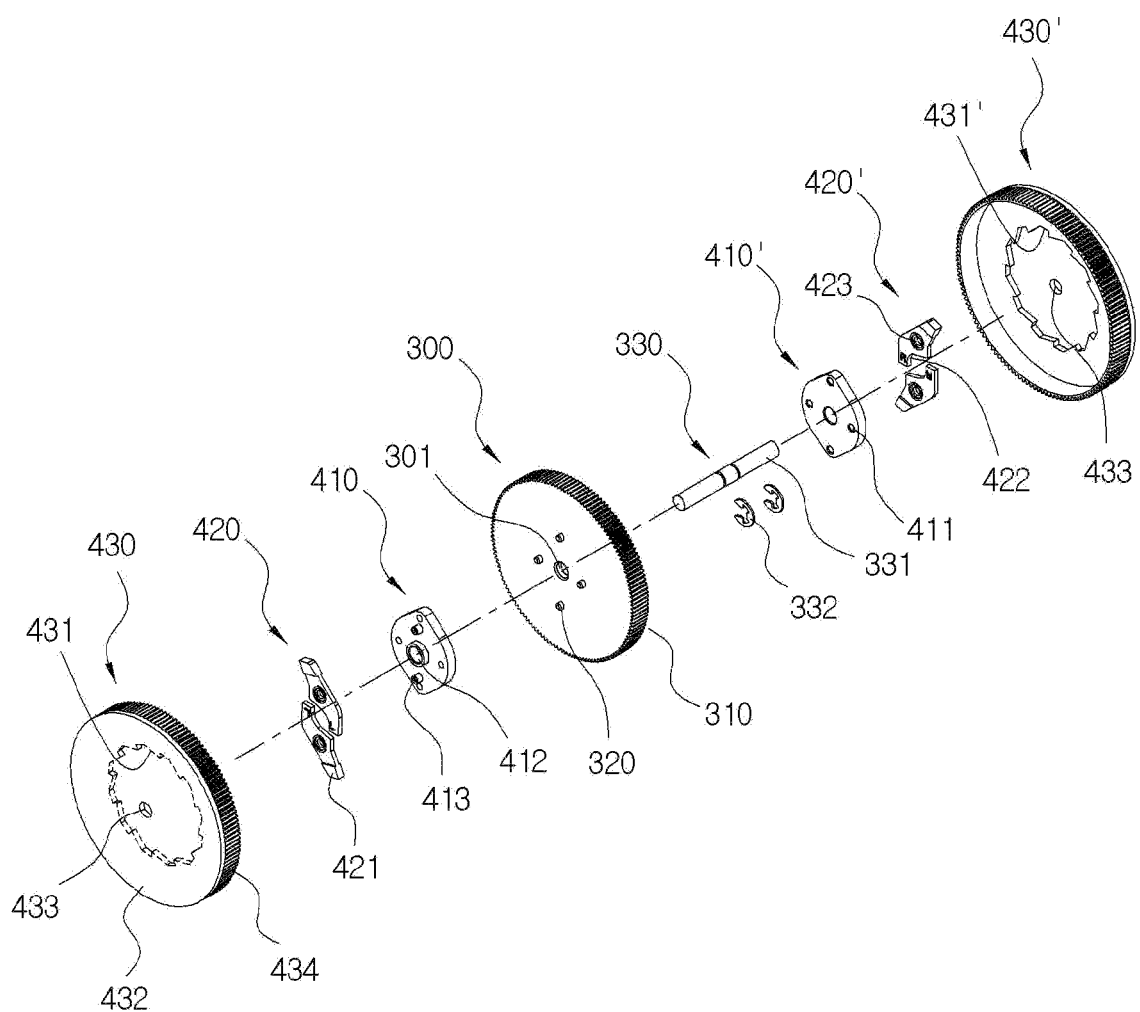
FIG. 11 is an exploded perspective view of the portable self-power-generating apparatus according to the fifth embodiment of the present invention.

FIG. 10 is a view for describing a coupling relationship between a pinion gear member, a rotation member, and a power generation member in a portable self-power-generating apparatus according to the fifth embodiment of the present invention, and FIG. 11 is an exploded perspective view of the portable self-power-generating apparatus according to the fifth embodiment of the present invention.

As illustrated in FIGS. 10 and 11, the portable self-power-generating apparatus according to the fifth embodiment of the present invention further includes a rotation member 400 that is provided in each of the plurality of pinion gear members 300 and rotates according to a forward or reverse rotation of each pinion gear member, and a power generation member 500 that generates power according to the rotation of the rotation member 400. The rotation member 400 may be made of a metal or polycarbonate that is engineering plastic.

Further, in the portable self-power-generating apparatus according to the fifth embodiment of the present invention, as illustrated in FIG. 11, the pinion gear member 300 has a disk shape, a gear part 310 corresponding to the gear teeth is provided in a circumferential portion of the disk shape, a plurality of protrusions 320 are provided on both sides of the disk shape, and a through hole 301 through which a shaft 330 rotatably passes is provided in a central portion of the disk shape.

The rotation member 400 includes a first rotation member and a second rotation member fitted to the left and right sides or the upper and lower sides of the pinion gear member. The first rotation member may rotate in the counterclockwise direction, and the second rotation member may rotate in the clockwise direction.

As illustrated in FIGS. 10 and 11, the first rotation member includes a first lock plate 410 mounted on one side of the pinion gear member 300, a first flywheel 430 that has a first clutch gear 431 therein and rotates the power generation member 500 in one direction according to the reverse rotation (counterclockwise rotation) of the pinion gear member 300, and a first lock member 420 that is mounted on the first lock plate 410 and rotates the first flywheel 430. The second rotation member includes a second lock plate 410' mounted on the other side of the pinion gear member 300, a second flywheel 430' that has a second clutch gear 431' therein and rotates the power generation member 500 in one direction according to the forward rotation (clockwise rotation) of the pinion gear member 300, and a second lock member 420' that is mounted on the second lock plate 410' and rotates the second flywheel 430'. As illustrated in FIG. 11, the first lock member 420 and the second lock member 420' are arranged in opposite directions so that the first rotation member and the second rotation member rotate according to the forward rotation or the reverse rotation of the pinion gear member 300, and gear directions of the first clutch gear 431 and the second clutch gear 431' are also provided opposite to each other.

As illustrated in FIG. 11, the first and second lock plates 410 and 410' are made of a flat plate having an approximately elliptical shape, a plurality of holes 411 corresponding to the plurality of protrusions 320 and fitted to the plurality of protrusions 320 are provided in the periphery of the flat plate, and an insertion hole 412 through which the shaft 330 passes is provided in a central portion of the flat plate. Further, a support step that protrudes in a cylindrical shape and supports the rotation of the lock member 420 is provided around the insertion hole 412, and a pair of protrusions 413 to which the lock member 420 is fitted is provided around the support step. Each of the pair of protrusions 413 has a step and is formed in two stages. Further, FIG. 11 illustrates a structure in which four protrusions 320 and four holes 411 are provided at approximately 90° intervals, but the present invention is not limited thereto, and two or three protrusions 320 and two or three holes 411 may be provided as long as the lock plate 410 may be fixed to the pinion gear member.

As illustrated in FIG. 11, the first and second lock members 420 and 420' are provided in a pair and each include a claw part 421 engaged with sawteeth of each of the first clutch gear 431 and the second clutch gear 431', a hole 423 fitted to the pair of protrusions 413, and a circular arc part 422 formed in a semi-circular shape corresponding to the cylindrical support step. The hole 423 is formed in two stages in correspondence with the protrusion 413 formed in two stages so as to firmly maintain the fitting state of the lock plate 410 and the lock member 420. As illustrated in FIG. 11, the claw part 421 is formed to have a step so as to transfer a sufficient rotational force to the first clutch gear 431 and the second clutch gear 431'.

As illustrated in FIG. 11, the first flywheel 430 and the second flywheel 430' are formed in the shape of a disk 432, and a hole 433 into which the shaft 330 is inserted is provided at a central portion of the disk 432. Further, a space is formed inside each of the first flywheel 430 and the second flywheel 430', and for example, the first clutch gear 431 and the second clutch gear 431', each having eight sawteeth, are provided from a central portion toward a peripheral portion of the space. Each sawtooth is inclined toward one direction and, for example, is formed to protrude at an angle of 60 to 80°. Meanwhile, as illustrated in FIG. 11, the gear directions of the first clutch gear 431 and the second clutch gear 431' are provided opposite to each other. That is, the gear direction of the first clutch gear 431 is provided such that the first clutch gear 431 may rotate in the counterclockwise direction, and the gear direction of the second clutch gear 431' is provided such that the second clutch gear 431' rotates in the clockwise direction.

Further, a ring gear 434 is provided on an outer circumference of the space. As can be seen in FIG. 10, the diameter of the first flywheel 430 and the second flywheel 430' described above is provided somewhat larger than the diameter of the pinion gear member 300. Thus, when the power generation member 500 rotates according to the rotation of the first flywheel 430 and the second flywheel 430', the pinion gear member 300 may be prevented from being in contact with the power generation member 500.

Meanwhile, for convenience of description, FIG. 10 illustrates a state in which the lock member and the lock plate are coupled to each other outside the flywheel, but the lock member and the lock plate are provided in an inner space of the flywheel.

The shaft 330 is made of, for example, stainless steel, and as illustrated in FIG. 11, a pair of annular grooves 331 are provided along the circumference, the pinion gear member is located between the pair of annular grooves 331, and E rings 332 are respectively fitted in the pair of annular grooves 331 to prevent the pinion gear member from being dislocated during the rotation.

As described above, in the portable self-power-generating apparatus according to the present invention, as illustrated in FIG. 10, the lock plate and the lock member are fitted to the pinion gear member, the lock plate and the lock member are provided in the inner space of the flywheel, and thus the portable self-power-generating apparatus may be downsized.

As illustrated in FIG. 10, the power generation member 500 includes a gear part 510 engaged with the rotation member 400, a motor 520, a rotary shaft 530 configured to transmit a rotational force of the gear part 510 to the motor 520, and a motor bracket for mounting the motor 520 on the main body 100. The gear part 510 is engaged with the ring gear 434 provided on the outer circumferences of the first flywheel 430 and the second flywheel 430', the gear part 510 rotates according to the rotation of the first flywheel 430 and the second flywheel 430', and thus power generation in the motor 520 is performed. Although a gear ratio of the ring gear 434 and the gear part 510 engaged with each other is not specified, it is preferable that the gear ratio has a value as large as possible to facilitate power generation.

Meanwhile, in the portable self-power-generating apparatus according to the present invention, in order to rotate the gear part 510 in one direction, an idle gear 600 is engaged between the first flywheel 430 and the gear part 510. That is, a rotational force of the first flywheel 430 is transmitted to the gear part 510 through the idle gear 600. The idle gear 600 is rotatably maintained by a shaft in the main body 100. As illustrated in FIG. 10, since the idle gear 600 is provided below the first flywheel 430, the outer diameter of the flywheel 430 is provided to be smaller than the outer diameter of the second flywheel 430'.

Next, a coupling relationship between the rack gear member 200, the pinion gear member 300, and the rotation member 400 will be described.

In the assembly of the portable self-power-generating apparatus according to the present invention, first, the pinion gear member 300 is inserted into the shaft 330, a flywheel support part is fitted to a flywheel part, the E rings 332 are fitted to the pair of annular grooves 331, and thus the pinion gear member is prevented from being dislocated during the rotation.

Next, the first and second lock plates 410 and 410' are inserted into the shaft 300 through the insertion hole 412, and the plurality of holes 411 of the first and second lock plates 410 and 410' are fitted to the plurality of protrusions 320 provided on both sides of the pinion gear member 300.

Next, the holes 423 of the first and second lock members 420 and 420' provided in a pair are fitted to the pair of protrusions 413 provided in the first and second lock plates 410 and 410'.

Subsequently, the holes 423 of the first flywheel 430 and the second flywheel 430' are inserted into the shaft 330, and the first and second lock members 420 and 420' are arranged to be located in the first clutch gear 431 and the second clutch gear 431'.

Thereafter, the gear part 510 is engaged with the idle gear 600 through the ring gear 434 of the first flywheel 430 and the ring gear of the second flywheel 430', the rack gear part 210 is located on the pinion gear member 300, and thus the self-power-generating apparatus is completed as illustrated in FIG. 10.

Next, the rotation of the pinion gear member 300, the rotation member 400, and the power generation member 500 according to the linear reciprocating motion of the rack gear member 200 described above will be described with reference to FIGS. 4 and 10.

In the portable self-power-generating apparatus according to the present invention, as illustrated in FIG. 10, the first clutch gear 431 and the second clutch gear 431' of the first flywheel 430 and the second flywheel 430' are maintained to be engaged with the lock member 420. That is, an angled portion of the claw part 421 of the lock member 420 is maintained to be engaged with the sawteeth of each of the first clutch gear 431 and the second clutch gear 431' formed to be inclined toward one direction, and the ring gear 434 and the gear part 510 of the first flywheel 430 and the second flywheel 430' are maintained to be engaged with each other.

For example, as illustrated in FIG. 4A, as the user pulls the handle part 220, the rack gear part 210 is withdrawn from the main body 100, and accordingly, each pinion gear member of the plurality of pinion gear members 300 rotates in the clockwise direction.

Thus, the first and second lock plates 410 and 410' and the first and second lock members 420 and 420' coupled to the pinion gear member 300 rotate in the clockwise direction.

That is, when the first and second lock members 420 and 420' rotate in the clockwise direction, a claw part 421 of the first lock member 420 is released from each sawtooth of the first clutch gear 431. Thus, the first flywheel 430 does not rotate, and the second clutch gear 431' engaged with the claw part 421 of the second lock member 420' rotates in the clockwise direction. Thus, when the rack gear part 210 is withdrawn from the main body 100 as the user pulls the handle part 220, the second flywheel 430' according to the present invention rotates in one direction, for example, only the clockwise direction in a state illustrated in FIG. 10, and the gear part 510 rotates in the counterclockwise direction.

Further, as illustrated in FIG. 4B, by pushing the handle part 220, the rack gear part 210 is inserted into the main body 100, and accordingly, each pinion gear member of the plurality of pinion gear members 300 rotates in the counterclockwise direction.

That is, when the first and second lock members 420 and 420' rotate in the counterclockwise direction, a claw part 421 of the second lock member 420' is released from each sawtooth of the second clutch gear 431'. Thus, the second flywheel 430 does not rotate, and the first clutch gear 431 engaged with the claw part 421 of the first lock member 420 rotates in the counterclockwise direction. Thus, when the rack gear part 210 is inserted into the main body 100 as the user pushes the handle part 220, the first flywheel 430 according to the present invention rotates in one direction, for example, only in the counterclockwise direction in a state illustrated in FIG. 10. Accordingly, the idle gear 600 rotates in the clockwise direction, and the gear part 510 rotates in the counterclockwise direction.

As described above, in the portable self-power-generating apparatus according to the fifth embodiment of the present invention, the first flywheel 430 rotates in the counterclockwise direction according to the reciprocating motion of the rack gear member 200, and even when the second flywheel 430' rotates in the clockwise direction, the gear part 510 provided in the power generation member 500 continuously rotates in one direction, that is, only the counterclockwise direction, and thus power generation can be continued.

Sixth Embodiment

Next, the portable self-power-generating apparatus according to the sixth embodiment of the present invention will be described with reference to FIG. 12. Further, in the sixth embodiment, the same reference numerals are assigned to the same parts as in the fifth embodiment, and a repeated description thereof will be omitted.

Figure 12:
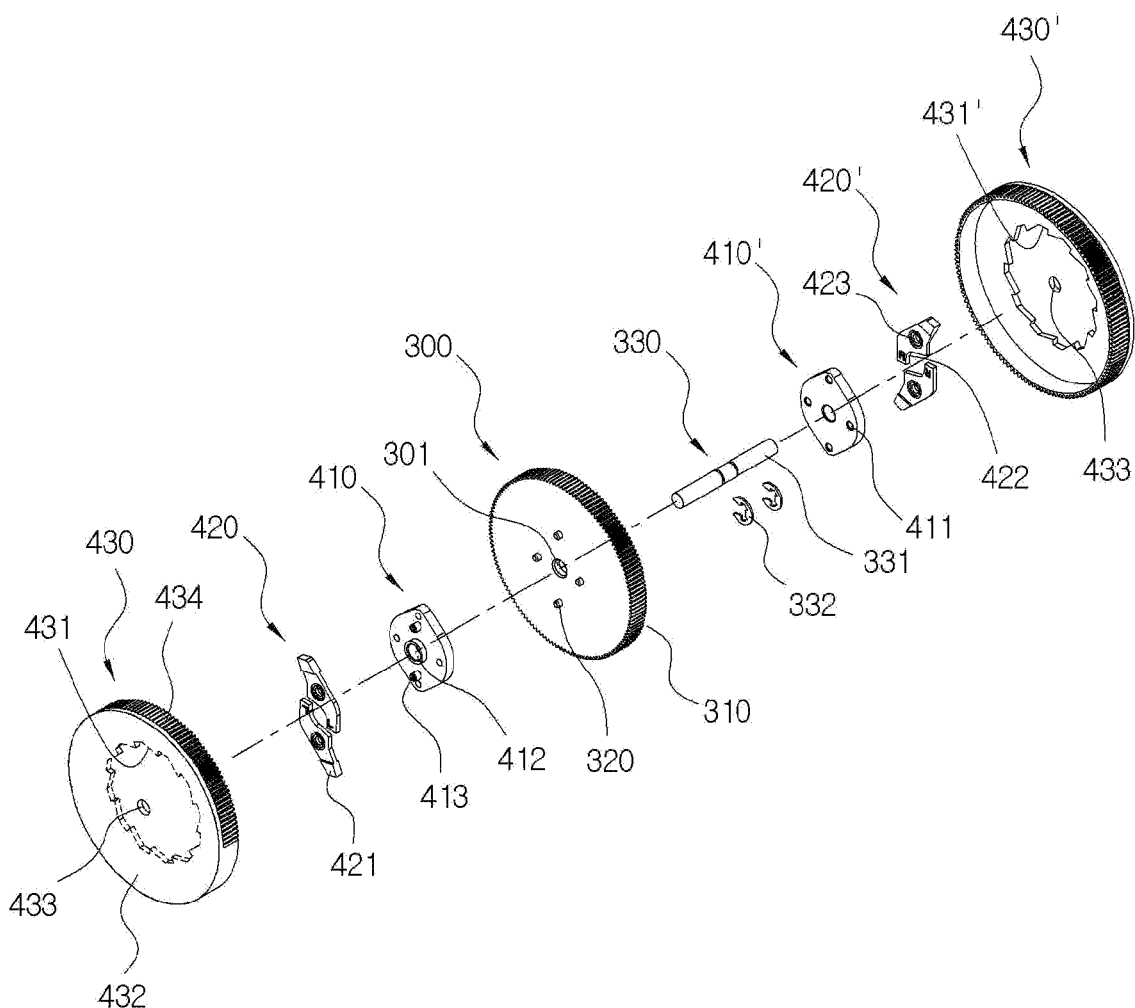
FIG. 12 is a view illustrating a state of a ring gear of a first flywheel in a portable self-power-generating apparatus according to a sixth embodiment of the present invention.

FIG. 12 is a view illustrating a state of a ring gear of a first flywheel in the portable self-power-generating apparatus according to the sixth embodiment of the present invention.

In the fifth embodiment, in a state in which the claw part 421 of the first lock member 420 is released from each sawtooth of the first clutch gear 431, the first flywheel 430 does not rotate, and the second clutch gear 431' of the second flywheel 430' with which the claw part 421 of the second lock member 420' is engaged rotates in the clockwise direction. However, in the sixth embodiment, in order to prevent the rotation of the first flywheel 430 by the idle gear 600 when the second flywheel 430' rotates, the ring gear 434 is provided only in a half of the first clutch gear 431 as compared to the fifth embodiment.

Thus, for power generation, the gear part 510 rotates in the counterclockwise direction according to the clockwise rotation of the second flywheel 430', and the idle gear 600 rotates in the clockwise direction according to the rotation of the gear part 510. The rotational force of the idle gear 600 in the clockwise direction is transmitted to the first flywheel 430. However, the first flywheel 430 rotates in the counterclockwise direction. In this way, since the rotational force transmitted to the first flywheel 430 is transmitted to a portion where the ring gear 434 is not provided, the first flywheel 430 does not rotate.

Further, by pushing the handle part 220, the rack gear part 210 is inserted into the main body 100, and accordingly, each pinion gear member of the plurality of pinion gear members 300 rotates in the counterclockwise direction. That is, when the first and second lock members 420 and 420' rotate in the counterclockwise direction, the claw part 421 of the second lock member 420' is released from each sawtooth of the second clutch gear 431', the second flywheel 430' does not rotate, the first clutch gear 431 with which the claw part 421 of the first lock member 420 is engaged rotates in the counterclockwise direction, and the rotational force of the ring gear 434 provided in the first flywheel 430 is transmitted to the idle gear 600. Thus, the idle gear 600 rotates in the clockwise direction, and the gear part 510 rotates in the counterclockwise direction.

Seventh Embodiment

Next, a portable self-power-generating apparatus according to a seventh embodiment of the present invention will be described with reference to FIG. 13. Further, even in the seventh embodiment, the same reference numerals are assigned to the same parts as in the first to fourth embodiments, and a repeated description thereof will be omitted.

Figure 13:
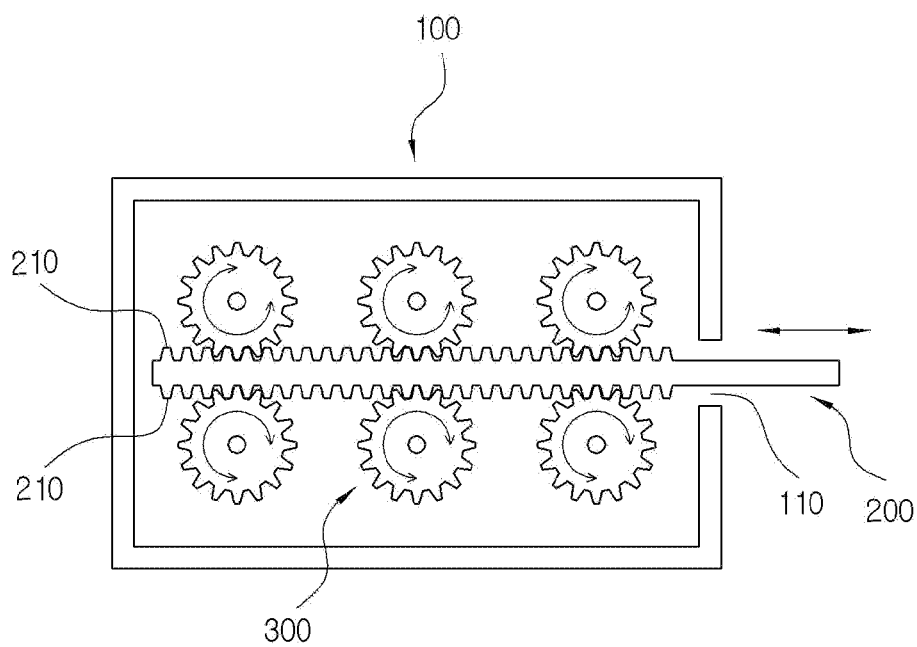
FIG. 13 is a view illustrating a layout of a rack gear member and a plurality of pinion gear members according to a seventh embodiment of the present invention.

FIG. 13 is a view illustrating a layout of a rack gear member and a plurality of pinion gear members according to the seventh embodiment of the present invention.

In the first to fourth embodiments, a structure is provided in which the plurality of pinion gear members 300 are provided in a row inside the main body 100, and the plurality of pinion gear members 300 rotate forward or in reverse. However, in the seventh embodiment, the plurality of pinion gear members 300 are provided in a plurality of rows.

Further, as illustrated in FIG. 13, a structure is provided in which the rack gear member 200 is provided with a pair of rack gear parts 210 in a vertical direction, and the plurality of pinion gear members 300 are coupled to upper portions and lower portions of the pair of rack gear parts 210.

Thus, when the rack gear part 210 is withdrawn from the main body 100, the plurality of pinion gear members 300 provided at the upper portion generate power while rotating in the counterclockwise direction, and the plurality of pinion gear members 300 provided at the lower portion generate power while rotating in the clockwise direction. When the rack gear part 210 is inserted into the main body 100, the plurality of pinion gear members 300 provided at the upper portion generate power while rotating in the clockwise direction, and the plurality of pinion gear members 300 provided at the lower portion generate power while rotating in the counterclockwise direction.

In the seventh embodiment having the above-described structure, power generation efficiency can be increased as compared to the portable self-power-generating apparatus illustrated in the first to fourth embodiments.

Further, although the above description illustrates a structure in which the pair of rack gear parts 210 are provided in the vertical direction and the plurality of pinion gear members 300 are coupled to each of the pair of rack gear parts, the present invention is not limited thereto, and a structure may be applied in which the pair of rack gear parts are provided in the left-right direction and the plurality of pinion gear members 300 are coupled to each of the pair of rack gear parts.

Further, in the structure illustrated in FIG. 13, a structure is described in which the first opening 110 is provided in the main body 100. However, the present invention is not limited thereto and may be also applied to a structure in which the first opening 110 and the second opening 130 are provided in the main body 100 as illustrated in FIG. 7 or a structure in which the first hinge 222 and the second hinge 225 are provided in the rack gear member 200 as illustrated in FIG. 9.

Eighth Embodiment

Next, a portable self-power-generating apparatus according to an eighth embodiment of the present invention will be described with reference to FIGS. 14 and 15. Further, even in the eighth embodiment, the same reference numerals are assigned to the same parts as in the first to fourth embodiments, and a repeated description thereof will be omitted.

Figure 14:
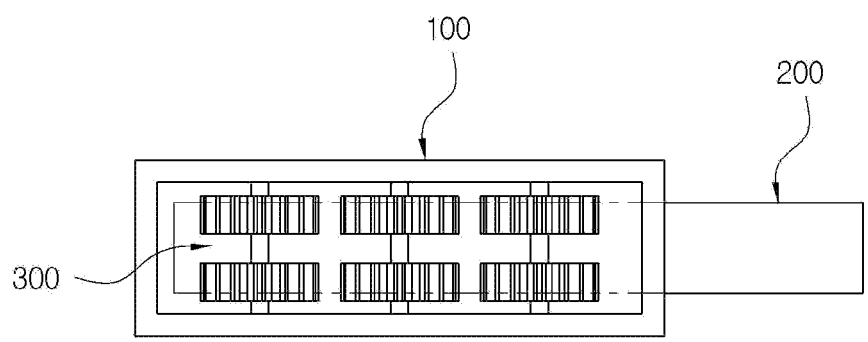
FIG. 14 is a plan view illustrating a layout of a rack gear member and a plurality of pinion gear members according to an eighth embodiment of the present invention.
Figure 15:
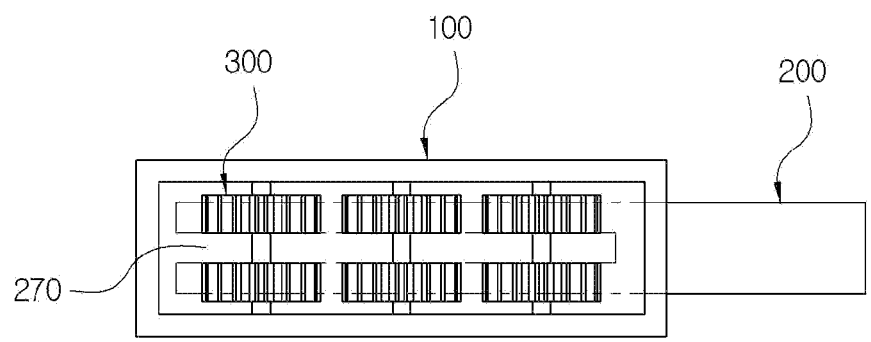
FIG. 15 is a plan view illustrating another example of the rack gear member according to the eighth embodiment of the present invention.

FIG. 14 is a plan view illustrating a layout of a rack gear member and a plurality of pinion gear members according to the eighth embodiment of the present invention, and FIG. 15 is a plan view illustrating another example of the rack gear member according to the eighth embodiment of the present invention.

In the first embodiment, the structure is provided in which the plurality of pinion gear members 300 are provided in a row inside the main body 100, and the plurality of pinion gear members 300 rotate forward or in reverse. However, in the eighth embodiment, the plurality of pinion gear members 300 are provided in a plurality of rows. Although FIG. 14 illustrates a structure in which the plurality of pinion gear members 300 are provided in two rows, the present invention is not limited thereto, and the pinion gear members 300 may be provided in three or more rows.

Further, as illustrated in FIG. 15, a structure may be applied in which a slit 270 is provided at a portion of the rack gear part 210 so that the rack gear member 200 is operated while being separated from each row of the plurality of pinion gear members 300 provided in two rows. That is, as illustrated in FIG. 12, by applying the rack gear member 200 having the slit 270 formed therein to a structure in which the first flywheel 430 and the second flywheel 430' are provided, each of the pinion gear members 300 may be operated in the same manner as in the first embodiment.

Ninth Embodiment

Next, a portable self-power-generating apparatus according to a ninth embodiment of the present invention will be described with reference to FIGS. 16 and 17. Further, even in the ninth embodiment, the same reference numerals are assigned to the same parts as in the first to fourth embodiments, and a repeated description thereof will be omitted.

Figure 16:
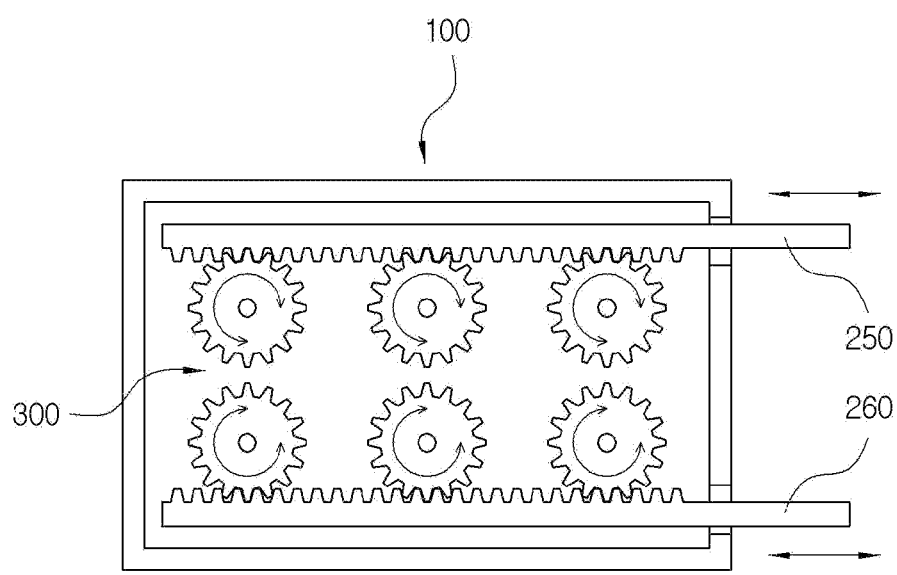
FIG. 16 is a view illustrating a layout of a rack gear member and a plurality of pinion gear members according to a ninth embodiment of the present invention.
Figure 17:
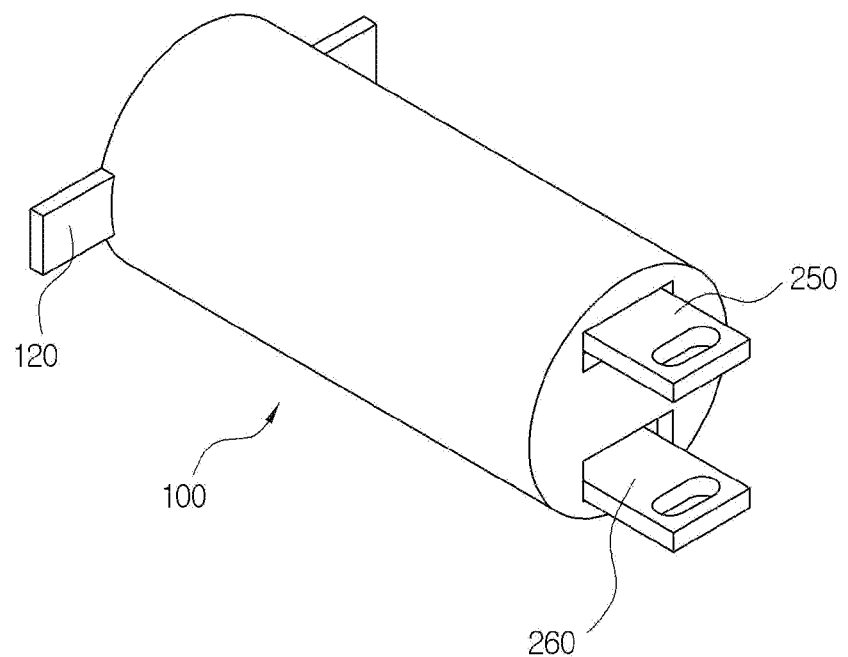
FIG. 17 is a perspective view of an exterior of the portable self-power-generating apparatus illustrated in FIG. 16.

FIG. 16 is a view illustrating a layout of a rack gear member and a plurality of pinion gear members according to the ninth embodiment of the present invention, and FIG. 17 is a perspective view of an exterior of the portable self-power-generating apparatus illustrated in FIG. 16.

In the seventh and eighth embodiments, the structure is illustrated in which the plurality of pinion gear members 300 provided in two rows are operated by the one rack gear member 200. However, in the ninth embodiment, the pinion gear members 300 may be operated by two rack gear members as illustrated in FIGS. 16 and 17.

That is, the rack gear member 200 may include a first rack gear member 250 provided corresponding to the plurality of pinion gear members provided in the first row and a second rack gear member 260 provided corresponding to the plurality of pinion gear members provided in the second row.

As illustrated in FIGS. 16 and 17, by providing the first rack gear member 250 and the second rack gear member 260, the user may more efficiently generate power using both hands.

Tenth Embodiment

Next, a portable self-power-generating apparatus according to a tenth embodiment of the present invention will be described with reference to FIGS. 18A-18C. Further, even in the tenth embodiment, the same reference numerals are assigned to the same parts as in the first to fourth embodiments, and a repeated description thereof will be omitted.

Figure 18A:
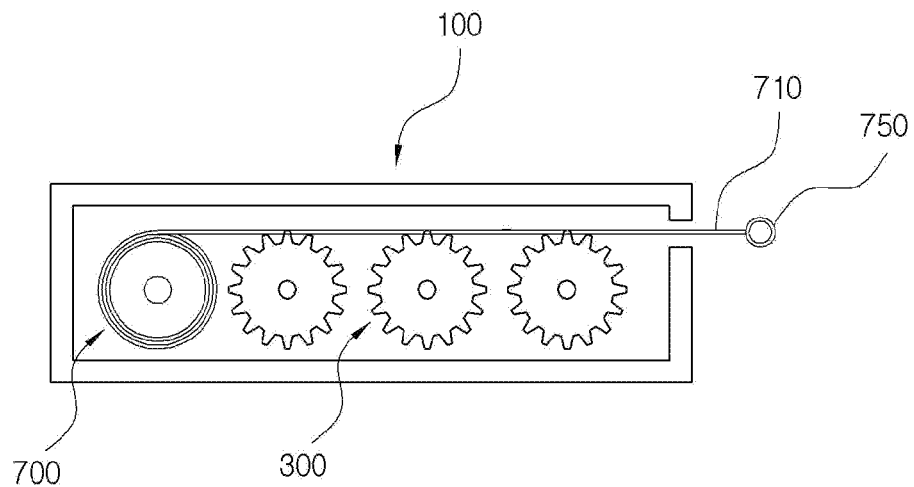
FIGS. 18A-18C are configuration diagrams of a portable self-power-generating apparatus according to a tenth embodiment of the present invention.
Figure 18B:
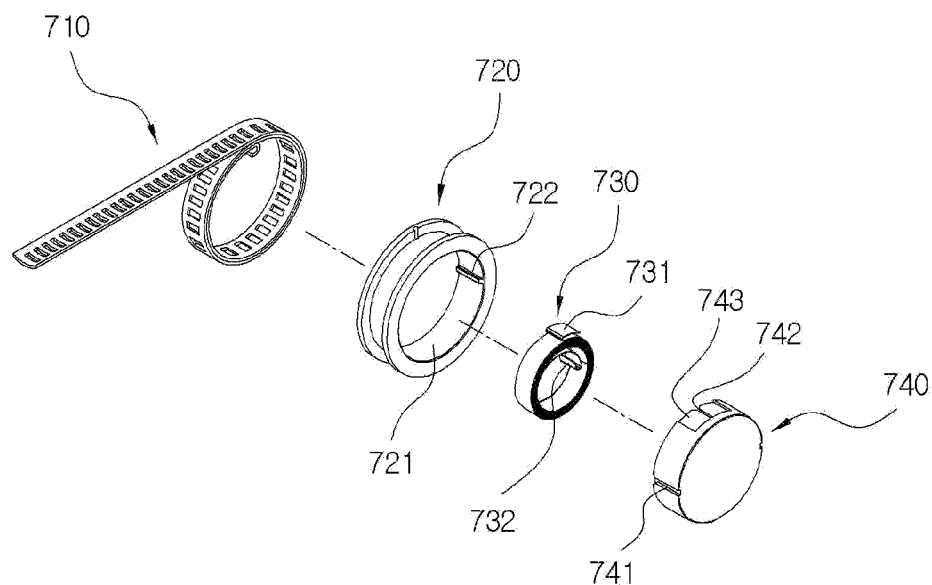
Figure 18C:
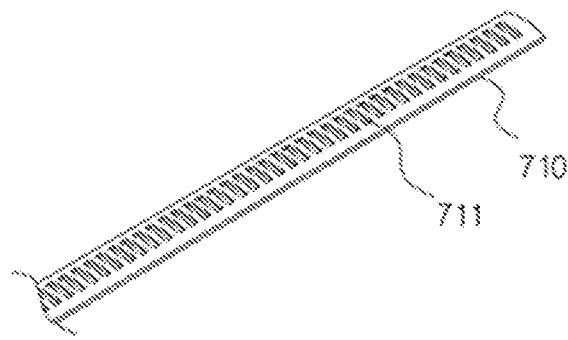

FIGS. 18A-18C are configuration diagrams of a portable self-power-generating apparatus according to the tenth embodiment of the present invention.

In the tenth embodiment, as illustrated in FIG. 18A, a structure in which a rack gear part 710 is wound around a rotation unit 700 inside the main body 100 is provided as the rack gear member.

As illustrated in FIG. 18B, the rotation unit 700 is rotatably mounted on the main body 100 and includes a reel 720 that maintains the rack gear part 710 in a wound state and may rotate according to the pulling and winding of the rack gear part 710, a spiral spring 730 made of spring steel and maintaining a state of a spring wound, for example, 8 to 12 times, and a spring cover part 740 fitted to the reel 720 and having the spiral spring 730 embedded therein.

The rack gear part 710 is made of a metal but is sufficient as long as the rack gear part 710 has a function capable of performing winding and unwinding on the reel 720 and is not limited to a specific material. One end of the rack gear part 710 may be fixed to the reel 310, the other end of the rack gear part 710 is fixed to a ring 750 as illustrated in FIG. 18A, and a pulling state of the rack gear part 710 is controlled by an elastic force of the spiral spring 730.

As illustrated in FIG. 18C, the rack gear part 710 includes gear grooves 711 engaged with the gear teeth of the pinion gear members 300.

As illustrated in FIG. 18B, the reel 720 has a reel shape to maintain the rack gear part 710 in a wound state, a receiving part 721 for accommodating the spring cover part 740 is provided at a central portion of the reel 720, and a plurality of protrusions 722 to which the spring cover part 740 is fitted are provided inside the reel 720.

The spiral spring 730 is made of a spring steel, for example, maintains the state of the spring wound 8 to 12 times, an outer one end of the spiral spring is inserted into an insertion hole 742 formed in the spring cover part 740, and an inner one end of the spiral spring 730 is inserted into a spring holder provided in the main body 100. The spiral spring 730 is maintained in a wound state, and in response to this, the rack gear part 710 also maintains a state of being wound around the reel 720. Thus, the pulling of the rack gear part 710 by the user is limited in response to a loosening condition of the spiral spring 730, and the rack gear part 710 is restored to be wound around the reel 720 by a restoration force of the spiral spring 730.

The spring cover part 740 is formed in a hollow cylindrical shape to maintain the spiral spring 730 therein, a plurality of grooves 741 corresponding to the plurality of protrusions 722 for fitting with the plurality of protrusions 722 are formed outside the spring cover part 740, and the insertion hole 742 into which an outer one end 731 of the spiral spring 730 is inserted and a seating part 743 on which the outer one end inserted through the insertion hole 742 is seated are provided in a circumferential portion. Thus, the outer one end 731 of the spiral spring 730 is fitted to the receiving part 721 of the reel 720 while being seated on the seating part 743 through the insertion hole 742, and thus the outer one end 731 of the spiral spring 730 can be prevented from being separated from the spring cover part 740.

Thus, in the tenth embodiment, in a state illustrated in FIG. 18A, as the user pulls the ring 750, the gear grooves 711 are engaged with the gear teeth of the pinion gear members 300, each pinion gear member rotates in the clockwise direction, and thus power is generated. When the user stops the pulling of the ring 750, the pinion gear member rotates in the counterclockwise direction by the restoration force of the spiral spring 730, and thus the power may be continuously generated.

Eleventh Embodiment

Next, a portable self-power-generating apparatus according to an eleventh embodiment of the present invention will be described.

In the portable self-power-generating apparatus according to the fifth embodiment, the structure in which the motor 520 rotates by rotation of the gear part 510 has been described. However, in the eleventh embodiment, a stator and a rotor may be applied.

That is, for example, the technology disclosed in Patent Document 2 as a rotation member may be applied to each pinion gear member 300 applied to the present invention. The stator is provided on the inner circumferential surface of the pinion gear member 300 according to the present invention, and the rotor is provided spaced apart from the stator by being inserted into the pinion gear member 300. Further, a first rotation unit configured to rotate the rotor in one direction using a rotational force of the pinion gear member 300 generated when the rack gear member 200 linearly moves in one direction and a second rotation unit configured to rotate the rotor in the one direction using a reverse rotational force of the pinion gear member 300 generated when the rack gear member linearly moves in the other direction are provided. Thus, a structure may be provided in which the plurality of pinion gear members 300 are operated simultaneously.

An example of using the portable self-power-generating apparatus configured above will be described with reference to FIG. 19.

Figure 19:
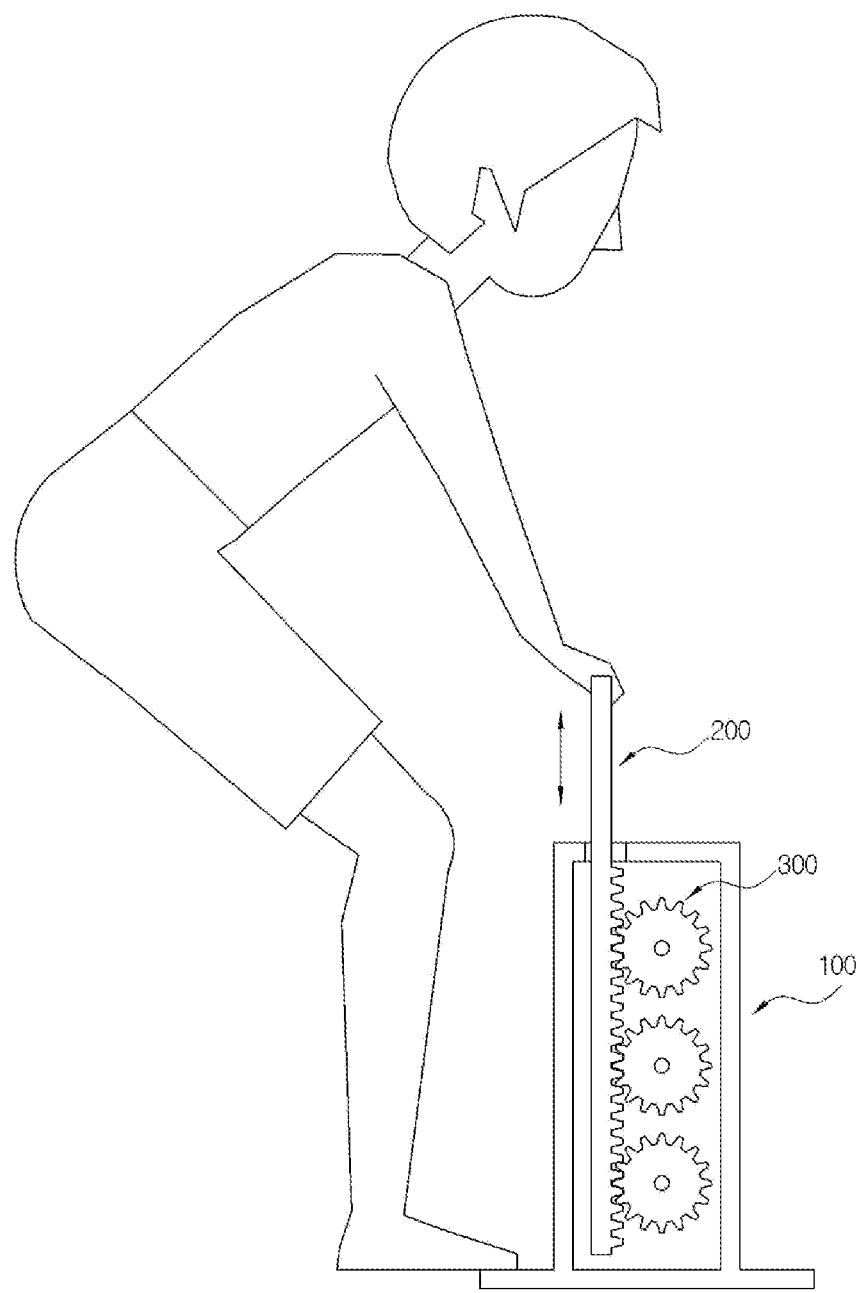
FIG. 19 is a view illustrating an example of a usage state of the portable self-power-generating apparatus of the present invention.

FIG. 19 is a view illustrating an example of a usage state of the portable self-power-generating apparatus of the present invention.

As illustrated in FIG. 19, by erecting the main body 100, supporting the pair of support parts 120 with the user's feet, and allowing the rack gear member 200 to linearly reciprocate in the vertical direction, the plurality of pinion gear members 300 repeatedly perform the forward rotation or the reverse rotation, and accordingly, the gear part 510 rotates to continuously generate power.

Electricity generated by the power generation member 500 is charged to a battery (not illustrated) provided in the main body. Further, the main body 100 may be equipped with a universal serial bus (USB) terminal connected to the battery, and power may be supplied to an electric device, for example, a smartphone, a laptop, a communication device for military or emergency use, and a lighting device or a heating device such as a hand heater and an electric burner, the electric device and the heating device being connected through the USB terminal.

Hereinabove, the invention made by the present inventor has been described in detail according to the embodiments. However, the present invention is not limited to the embodiments, and it is obvious that the present invention may be changed in various manners without departing from the subject matter thereof.

Figure 20:
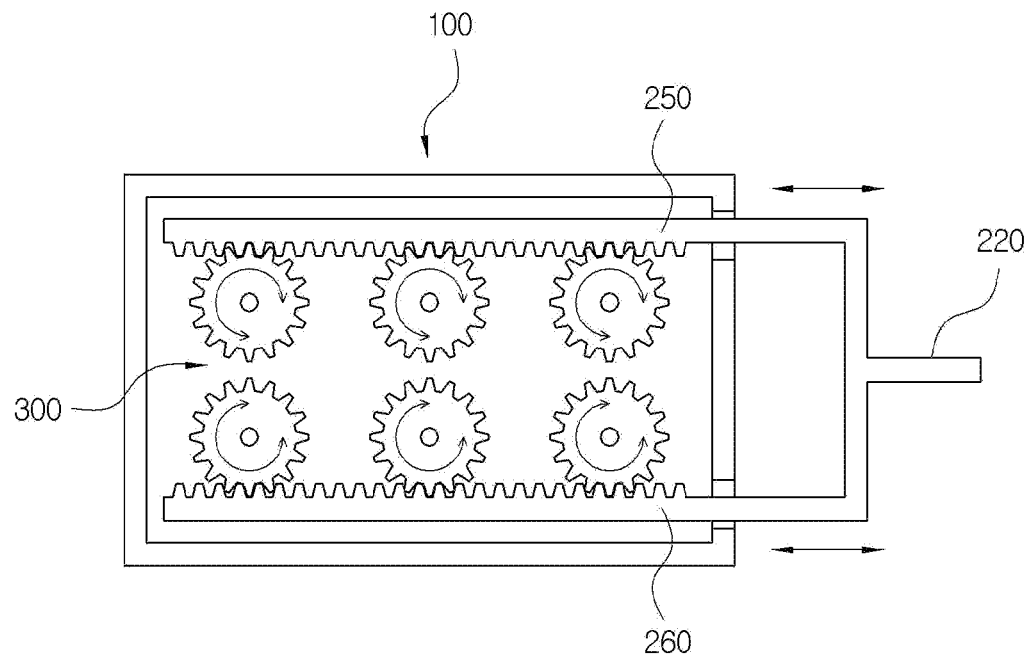
FIG. 20 is a perspective view of a modified example of the portable self-power-generating apparatus illustrated in FIG. 16.
Figure 21:
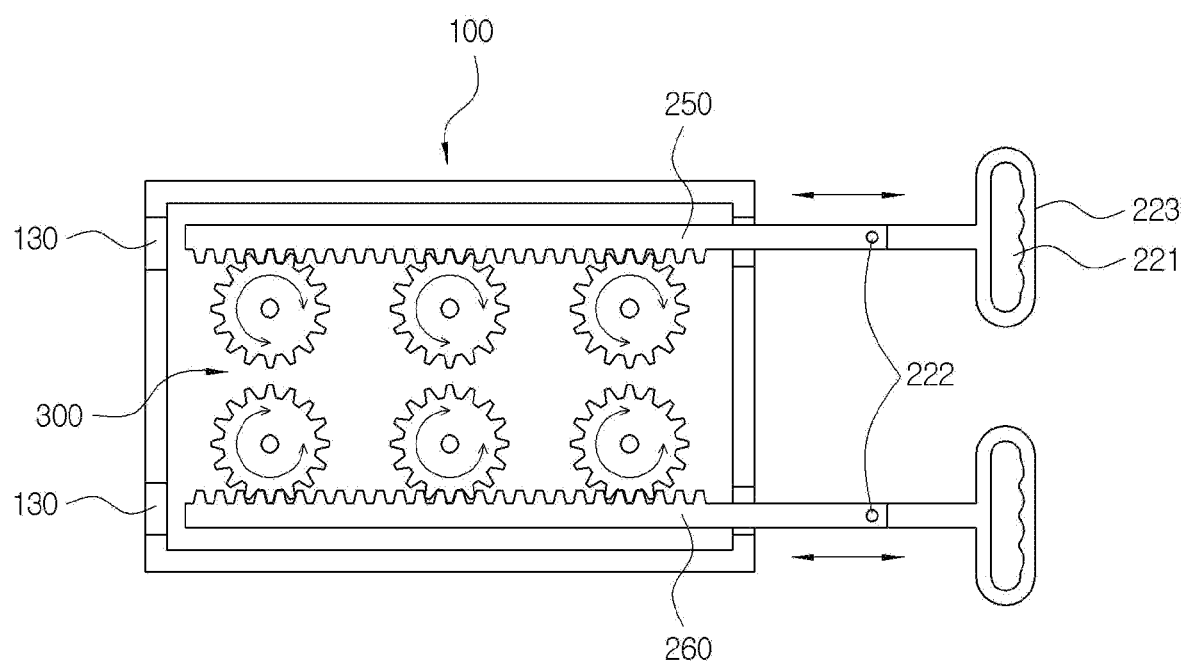
FIG. 21 is a perspective view of another modified example of the portable self-power-generating apparatus illustrated in FIG. 16.

That is, in the ninth embodiment, as illustrated in FIG. 16, a structure is illustrated in which the rack gear member 200 includes the first rack gear member 250 provided corresponding to the plurality of pinion gear members provided in the first row and the second rack gear member 260 provided corresponding to the plurality of pinion gear members provided in the second row, and the first rack gear member 250 and the second rack gear member 260 are operated with both hands. However, as illustrated in FIG. 20, a structure may be also applied in which the first rack gear member 250 and the second rack gear member 260 are connected to each other through the handle part 220.

Further, the structure of the handle 223 as illustrated in FIG. 8 may be applied to each of the first rack gear member 250 and the second rack gear member 260 illustrated in FIG. 16.

Figure 22:
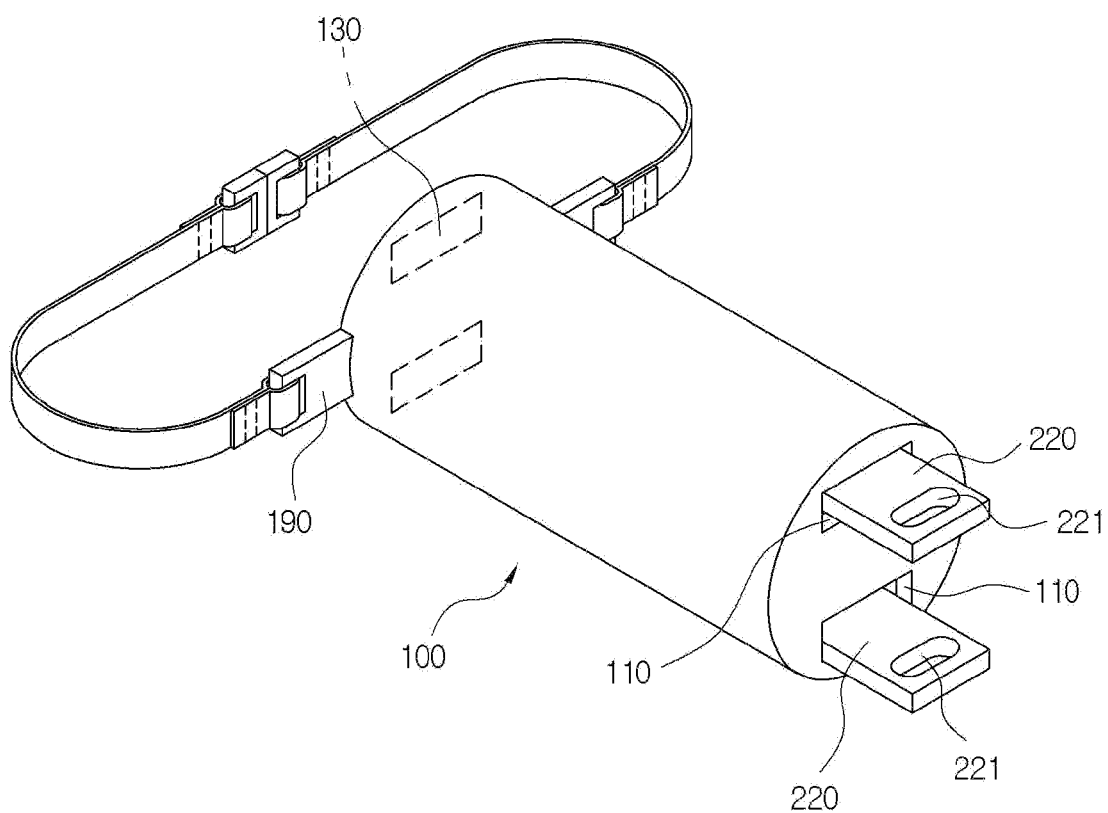
FIG. 22 is a perspective view of a modified example of an exterior of the portable self-power-generating apparatus according to the present invention.

Further, FIG. 2 illustrates the pair of support parts 120 provided at a lower portion of the main body 100 for supporting with both feet when the user performs self-power generation, but the present invention is not limited thereto, and as illustrated in FIG. 22, a pair of handle parts 220 and a belt-shaped fastening member 190 may be provided and used.

INDUSTRIAL APPLICABILITY

By using the portable self-power--generating apparatus according to the present invention, the user may repeatedly perform an operation of pulling the rack gear member with one hand or both hands in emergencies in which the supply of electricity is not available normally, such as in a military operation, a refugee village, a disaster caused by earthquake or the like, emergency situations on ships, or an outdoor activity, and thus power can be generated continuously for a long time.

The invention claimed is:

1. A portable self-power-generating apparatus for performing self-power generation by a user, the apparatus comprising:
   a main body;
   a rack gear member that linearly reciprocates inside the main body by the user;
   a plurality of pinion gear members provided inside the main body, coupled to the rack gear member, and configured to perform a forward rotation or a reverse rotation according to a linear reciprocating motion of the rack gear member;
   a rotation member provided in each of the plurality of pinion gear members and configured to rotate according to the forward rotation or the reverse rotation of each of the plurality of pinion gear members; and
   a power generation member configured to generate power according to the rotation of the rotation member,
   wherein a first opening and a second opening through which the rack gear member enters or exits are provided at upper portions of the main body, and
   wherein each of the plurality of pinion gear members sequentially performs the forward rotation or the reverse rotation according to the linear reciprocating motion of the rack gear member.

2. The portable self-power-generating apparatus of claim 1, wherein the rack gear member includes:
   a rack gear part provided inside the main body and configured to rotate each of the plurality of pinion gear members in the forward rotation or the reverse rotation; and
   a handle part provided outside the main body and allowing the user to linearly reciprocate the rack gear part.

3. The portable self-power-generating apparatus of claim 2, further comprising a locking part provided in the rack gear member to prevent the rack gear member from being separated from the main body.

4. The portable self-power-generating apparatus of claim 2, wherein the rack gear part and the handle part are coupled by a hinge.

5. The portable self-power-generating apparatus of claim 4, wherein the rack gear part includes a first rack gear part and a second rack gear part, and the first rack gear part and the second rack gear part are connected by a second hinge.

6. The portable self-power-generating apparatus of claim 2, wherein the plurality of pinion gear members are provided in a row.

7. The portable self-power-generating apparatus of claim 2, wherein the plurality of pinion gear members are provided in a plurality of rows.

8. The portable self-power-generating apparatus of claim 7, wherein the rack gear part is provided as a pair of rack gear parts in an up-down direction or a left-right direction of the rack gear member, and
   the plurality of pinion gear members are coupled to each of the pair of rack gear parts.

9. The portable self-power-generating apparatus of claim 2, wherein the rack gear member includes:
   a first rack gear member provided corresponding to the plurality of pinion gear members provided in a first row; and
   a second rack gear member provided corresponding to the plurality of pinion gear members provided in a second row.

10. The portable self-power-generating apparatus of claim 1, wherein a support part for supporting the main body when the user performs self-power generation is provided at a lower portion of the main body.

11. The portable self-power-generating apparatus of claim 1, wherein the rotation member includes a first rotation member and a second rotation member fitted to left and right sides or upper and lower sides of each of the plurality of pinion gear members,
   wherein the first rotation member rotates in a counterclockwise direction, and the second rotation member rotates in a clockwise direction.

12. The portable self-power-generating apparatus of claim 11, wherein the first rotation member includes:
   a first lock plate mounted on one side of each of the plurality of pinion gear members;
   a first flywheel having a first clutch gear formed therein and configured to rotate the power generation member in one direction according to the reverse rotation of each of the plurality of pinion gear members; and
   a first lock member mounted on the first lock plate and configured to rotate the first flywheel, and
   the second rotation member includes:
   a second lock plate mounted on the other side of each of the plurality of pinion gear members;
   a second flywheel having a second clutch gear formed therein and configured to rotate the power generation member in one direction according to the forward rotation of each of the plurality of pinion gear members; and
   a second lock member mounted on the second lock plate and configured to rotate the second flywheel.

13. The portable self-power-generating apparatus of claim 12, wherein the power generation member includes a gear part coupled to the first flywheel and the second flywheel to rotate in one direction.

14. A portable self-power-generating apparatus for performing self-power generation by a user, the apparatus comprising:
   a main body;
   a rack gear member that linearly reciprocates inside the main body by the user;
   a plurality of pinion gear members provided inside the main body, coupled to the rack gear member, and configured to perform a forward rotation or a reverse rotation according to a linear reciprocating motion of the rack gear member;
   a rotation member provided in each of the plurality of pinion gear members and configured to rotate according to the forward rotation or the reverse rotation of each of the plurality of pinion gear members;
   a power generation member configured to generate power according to the rotation of the rotation member; and
   a rotation unit,
   wherein the rack gear member includes a rack gear part provided in the main body and configured to rotate each of the plurality of pinion gear members in the forward or reverse rotation,
   each of the plurality of pinion gear members sequentially performs the forward rotation or the reverse rotation according to the linear reciprocating motion of the rack gear member,
   the rack gear part maintains a state of being wound around the rotation unit, and
   gear grooves engaged with gear teeth of the plurality of pinion gear members are provided in the rack gear part.

15. The portable self-power-generating apparatus of claim 14, wherein the rotation unit includes:
   a reel rotatably mounted in the main body, configured to maintain the rack gear part in a wound state, and configured to rotate according to pulling and winding of the rack gear part;
   a spiral spring made of spring steel and configured to maintain the rack gear part in a state of being wound around the reel; and
   a spring cover part fitted to the reel and having the spiral spring embedded therein.

16. The portable self-power-generating apparatus of claim 1, wherein the power generation member includes:
   a stator provided on an inner circumferential surface of each of the plurality of pinion gear members; and
   a rotor inserted into each of the plurality of pinion gear members, provided to be spaced apart from the stator, and configured to rotate only in one direction according to the forward rotation or the reverse rotation of each of the plurality of pinion gear members.

* * * * *